United States Patent [19]
Acker et al.

[11] Patent Number: 5,671,378
[45] Date of Patent: Sep. 23, 1997

[54] METHOD AND SYSTEM FOR SIZING OF GRAPHICAL USER INTERFACE OBJECTS FOR LOCALIZATION

[75] Inventors: Warren Patrick Acker; Gregory Paul Andrews, both of Rochester, Minn.

[73] Assignee: International Business Machines Corporation, Armonk, N.Y.

[21] Appl. No.: 415,103

[22] Filed: Mar. 31, 1995

[51] Int. Cl.$^6$ .............................................. G06F 3/00
[52] U.S. Cl. ............................. 395/334; 395/758
[58] Field of Search ............................ 395/146, 149, 395/139, 138, 155–161, 326–358, 767–768, 758, 779–787; 345/117–120, 127–131, 146, 902; 364/419.01–419.07, 419.14, 419.16, 419.08–419.09

[56] References Cited

U.S. PATENT DOCUMENTS

| | | | |
|---|---|---|---|
| 5,001,697 | 3/1991 | Torres | 395/157 |
| 5,119,079 | 6/1992 | Hube et al. | 345/146 |
| 5,243,519 | 9/1993 | Andrews et al. | 364/419.05 |
| 5,251,130 | 10/1993 | Andrews et al. | 364/419.03 |
| 5,287,448 | 2/1994 | Nicol et al. | 395/159 |
| 5,293,476 | 3/1994 | Wolber et al. | 395/159 |
| 5,341,293 | 8/1994 | Vertelney et al. | 364/419.17 |
| 5,349,658 | 9/1994 | O'Rourke et al. | 395/700 |
| 5,363,483 | 11/1994 | Jones et al. | 395/161 |
| 5,377,318 | 12/1994 | Wolber | 395/159 |
| 5,416,903 | 5/1995 | Malcolm | 395/334 |
| 5,428,733 | 6/1995 | Carr | 395/159 |
| 5,437,008 | 7/1995 | Gay et al. | 395/161 |
| 5,450,538 | 9/1995 | Glaser et al. | 395/149 |
| 5,499,335 | 3/1996 | Silver et al. | 395/334 |
| 5,513,342 | 4/1996 | Leong et al. | 395/157 |
| 5,583,981 | 12/1996 | Pleyer | 395/334 |

FOREIGN PATENT DOCUMENTS

| | | | |
|---|---|---|---|
| 0 626 635 A2 | 11/1994 | European Pat. Off. | G06F 3/00 |
| 5216607 | 8/1993 | Japan | G06F 3/14 |

OTHER PUBLICATIONS

IBM Technical Disclosure Bulletin, vol. 32, No. 68, Nov. 1989: "Dynamically Sized Push Buttons.".
IBM Technical Disclosure Bulletin, vol. 33, No. 7, Dec. 1990: "National Language Enablement Considerations.".
IBM Technical Disclosure Bulletin, vol. 37, No. 8, Aug. 1994: "Sizing of Textual Elements for National Language Support.".
IBM Tech. Discl. Bull., "Balloon Windows for Supplementary Dialogues and Information", IBM Corp. Mar. 1991, pp. 263–265.
Advanced Interface Design Guide, IBM Corp., Jun. 1989, pp. 77–81.

*Primary Examiner*—John E. Breene
*Attorney, Agent, or Firm*—Duke W. Yee; Andrew J. Dillon

[57] ABSTRACT

A method in a data processing system for resizing and repositioning controls in a window displayed in a graphical user interface within the data processing system. The controls include symbols, such as text that may be replaced with other symbols, such as text in a different language. In response to replacing text in the controls within a window, an amount of resizing is determined for each control this amount of resizing is an amount that is required to expand the control to contain the replacement symbol. The maximum amount of resizing is recorded after each control has been analyzed. For each control in the window, the control is resized by the maximum amount of resizing. The maximum amount of resizing may be adjusted to ensure that the window will be fully displayed within the display device. Additionally, the expansion may be limited only to controls or windows that contain text.

16 Claims, 13 Drawing Sheets

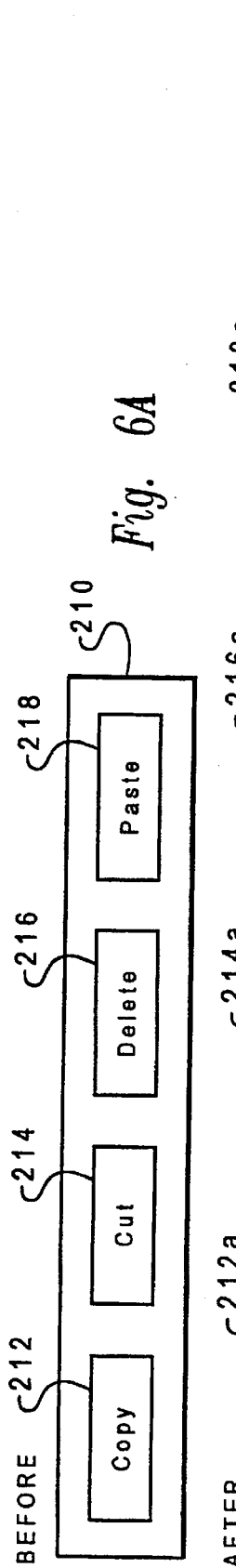
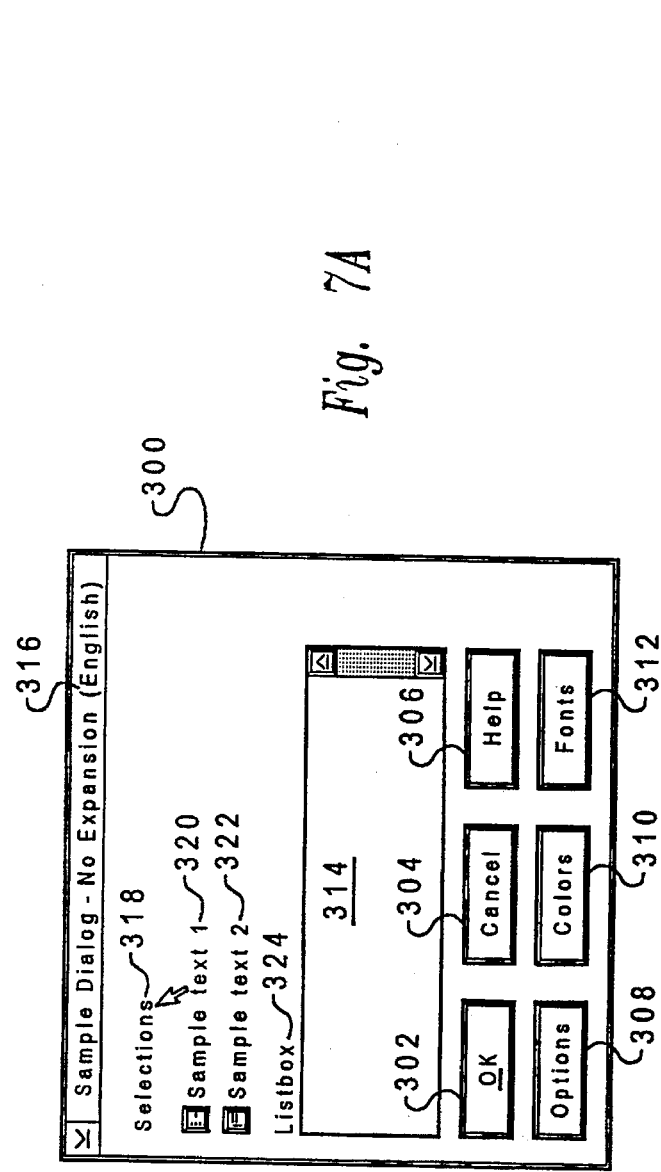

METHOD AND SYSTEM FOR SIZING OF GRAPHICAL USER INTERFACE OBJECTS FOR LOCALIZATION

BACKGROUND OF THE INVENTION

1. Technical Field

The present invention relates generally to an improved data processing system and in particular, to an improved graphical user interface within a data processing system. Still more particularly, the present invention relates to an improved method and system for proportional sizing of graphical user interface objects within a graphical user interface.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplified the interface between a user and a data processing system is the utilization of a so-called graphical user interface (GUI) to provide an intuitive and graphical interface between the user and the data processing system. A "GUI" is an interface system, including devices, by which a user interacts with a system, system components, and/or system applications via windows or view ports, icons, menus, pointing devices, etc. A Common User Access (CUA) interface is an example of a particular type of GUI.

More information on GUIs may be found in Systems Application Architecture Common User Access Advanced Interface Design Reference, SC34-4290-00 available from International Business Machine Corporation. Within the GUI, the display can be subdivided into several windows, each of which having its own boundaries and containing a different document or message. Each window also may contain a menu or other controls and the user may be able to enlarge and shrink individual windows. In some programs, windows are opened side by side on the screen and in others, open windows may overlap one another.

Many popular GUIs are available today, such as Microsoft Windows graphical user interface or Presentation Manager are based upon a desktop metaphor. "Presentation Manager" is a trademark of International Business Machines Corporation. In a desktop metaphor system, the display screen is treated as a virtual desktop. Graphical symbols placed on the virtual desktop (i.e., the display screen) are used to represent common objects found in the office environment such as files, folders, and printers. Various programs may be represented within the desktop using icons.

Computer programs utilizing windows for display may support multiple languages by loading translated strings from external files and replacing the original text displayed within the windows. In replacing text, translated strings almost never have the same number of characters as the original text that has been replaced. For example, in translating English text to other languages, the number of characters are often longer. Unless sufficient translation space was designed into the program's user interface, the dialog boxes, also called "windows" will need to be "resized" to accommodate the different string length resulting from the translation. An example of a method and system for translating languages within a software program is found in Andrews, et al., U.S. Pat. No. 5,243,519.

A "dialog box" is a special window in a graphical user interface displayed by the system or application to solicit a response from the user. The presently available methods cause dialog boxes and controls, the user interface building blocks, to "grow" when the text contained would otherwise be truncated. Such a method moves the right-hand boundary of the control or dialog box until the text is completely visible. A "control" in a graphical user interface is an object displayed on the screen that can be manipulated by the user to perform an action. Common controls are buttons, which allow the user to select options, and scroll bars, which allow the user to move through a document or position text within a window. A control is displayed as a "window" within the window with which the control is associated.

The problem is that by changing the size of some controls more than others, the dialog box takes on a radically different look. With reference to FIGS. 1A and 1B, an example of changes to a dialog box and controls are displayed after a translation of text from one language to another. Dialog box 2 contains four controls 4–10. When this text is translated into another language, dialog box 2a in FIG. 1B shows that controls 4a–10a look radically different from the original form of controls 4–10 in FIG. 1A. Items designated by a reference numeral including a letter "a" correspond to items designated by reference numeral without a letter. Furthermore, as can be seen control 4a is no longer aligned with control 6a–10a in dialog box 2a.

Translation of languages may result in nonuniform spacing as can be seen in FIGS. 2A and 2B. FIG. 2A illustrates a dialog box 12 containing controls 4–20. When the text is translated into another language, the spacing between the controls 14a–20a is no longer uniform as seen in FIG. 2B. An additional problem that may occur with the present method for altering the size of controls is that overlapping may occur if insufficient space is added between the controls by the programmer. FIGS. 3A and 3B are an example such a problem. In FIG. 3A, dialog box 22 contains controls 24–30. When the text in these controls are translated into another language, controls 24a–30a overlap within dialog box 22a, as illustrated in FIG. 3B. Similar problems may incur with the display of controls within windows other then dialog boxes. Consequently, it would be advantageous to have an improved method and system for sizing of graphical user interface objects within a GUI.

SUMMARY OF THE INVENTION

It is therefore one object of the present invention to provide an improved data processing system.

It is another object of the present invention to provide a method and system for an improved graphical user interface within a data processing system.

It is yet another object of the present invention to provide a method and system for proportional sizing of graphical user interface objects within a graphical user interface.

The present invention provides a method in a data processing system for resizing controls in a window displayed in a graphical user interface within the data processing system. The controls include symbols, such as text that may be replaced with other symbols, such as text in a different language. In response to replacing text in the controls within a window, an amount of resizing is determined for each control this amount of resizing is an amount that is required to expand the control to contain the replacement symbol. The maximum amount of resizing is recorded after each control has been analyzed. For each control in the window, the control is resized by the maximum amount of resizing. The maximum amount of resizing may be adjusted to ensure that the window will be fully displayed within the display device. Additionally, the expansion may be limited only to controls or windows that contain text.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A and 6B are pictorial illustrations of a dialog box before and after replacement of text in accordance with a preferred embodiment of the present invention;

FIGS. 7A–7C are pictorial illustrations of a dialog box depicting various types of field expansion in accordance with a preferred embodiment of the present invention;

DETAILED DESCRIPTION OF PREFERRED EMBODIMENT

Figure 4A:
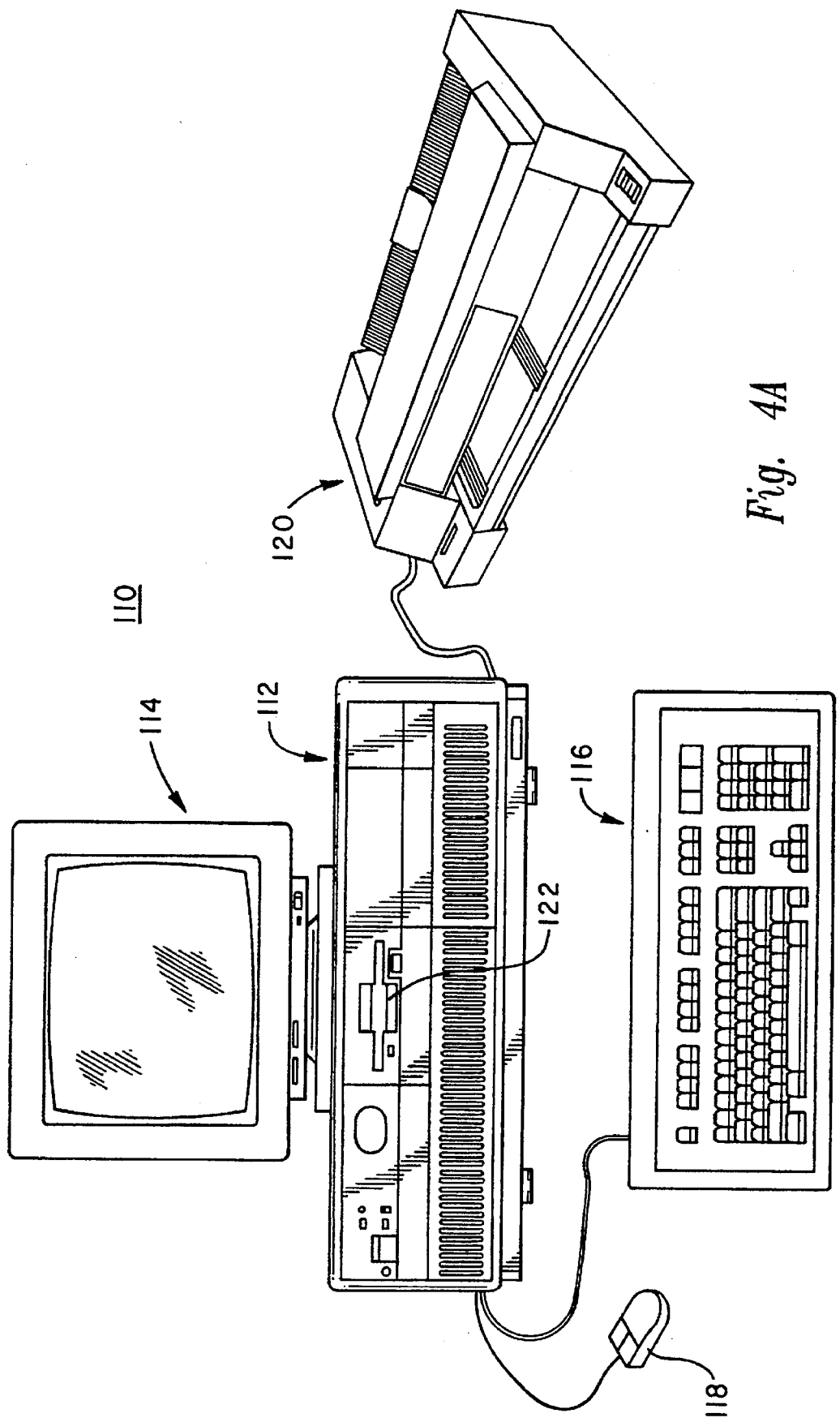
FIG. 4A is a data processing system in which the present invention can be employed.

Referring now to the figures, and in particular to FIG. 4A, a data processing system, personal computer system 110, in which the present invention can be employed is depicted. As shown, personal computer system 110 comprises a number of components, which are interconnected together. More particularly, a system unit 112 is coupled to and can drive an optional monitor 114 (such as a conventional video display). A system unit 112 also can be optionally coupled to input devices such as a PC keyboard 116 or a mouse 118. An optional output device, such as a printer 120, also can be connected to the system unit 112. Finally, system unit 112 may include one or more mass storage devices such as the diskette drive 122.

As will be described below, the system unit 112 responds to input devices, such as PC keyboard 116, the mouse 118, or local area networking interfaces. Additionally, input/output (I/O) devices, such as floppy diskette drive 122, display 114, printer 120, and local area network communication system are connected to system unit 112 in a manner well known. Of course, those skilled in the art are aware that other conventional components also can be connected to the system unit 112 for interaction therewith. In accordance with the present invention, personal computer system 110 includes a system processor that is interconnected to a random access memory (RAM), a read only memory (ROM), and a plurality of I/O devices.

In normal use, personal computer system 110 can be designed to give independent computing power to a small group of users as a server or a single user and is inexpensively priced for purchase by individuals or small businesses. In operation, the system processor functions under an operating system, such as IBM's OS/2 operating system, Apple Computer Corporation's Mac OS or DOS. OS/2 is a registered trademark of International Business Machines Corporation. "Mac OS" is a registered trademark of Apple Computer Corporation.

Figure 4B:
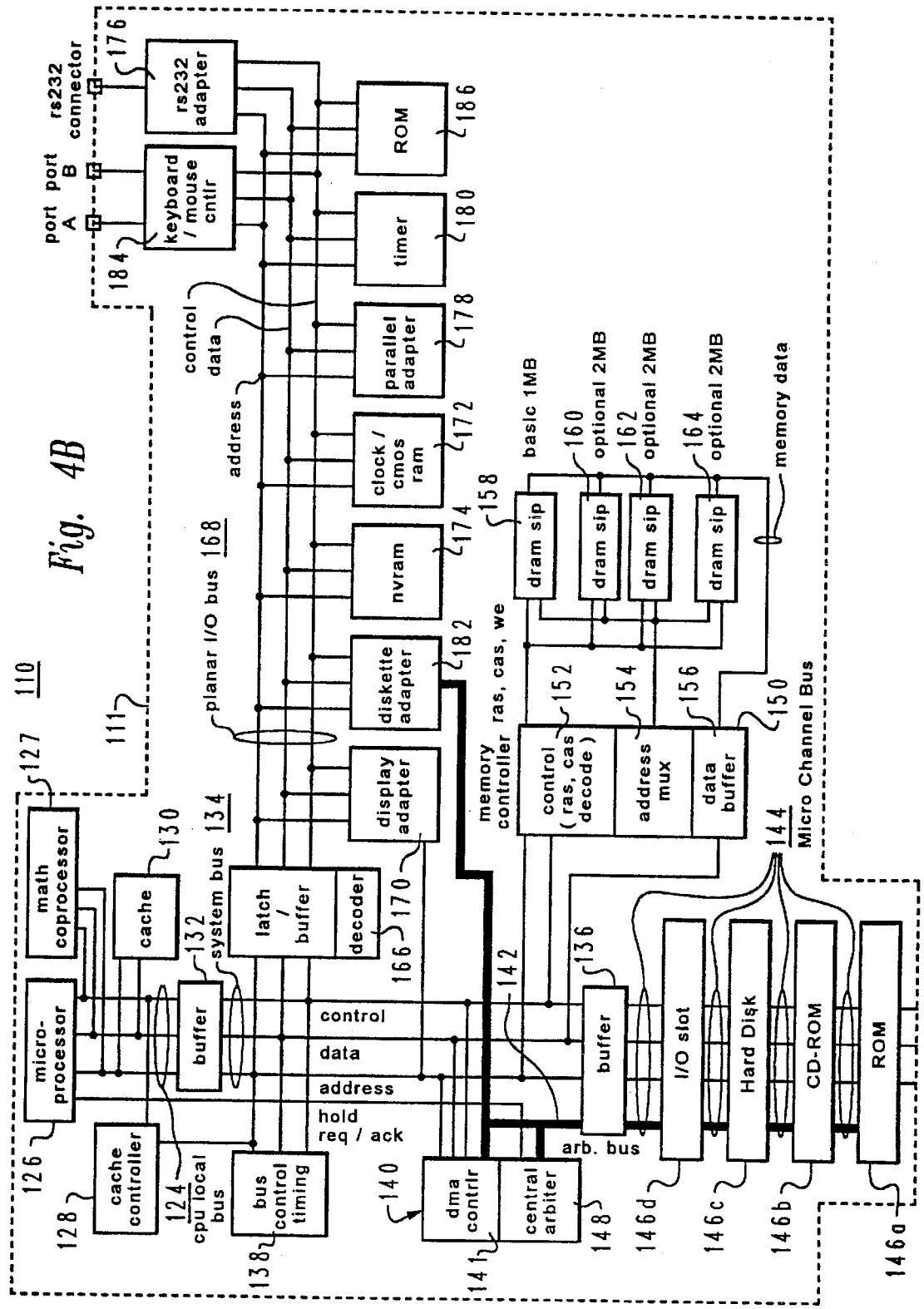
FIG. 4B is a block diagram illustrating the various components of the data processing system depicted in FIG. 4A in accordance with the present invention.

Prior to relating the above structure to the present invention, a summary of the operation in general of personal computer system 110 may merit review. Referring to FIG. 4B, there is shown a block diagram of personal computer system 110 illustrating the various components of personal computer system 110 in accordance with the present invention. FIG. 4B further illustrates components of motherboard 111 and the connection of motherboard 111 to I/O slots 146a–146d and other hardware of personal computer system 110. Connected to motherboard 111 is the system central processing unit (CPU) 126 comprised of a microprocessor which is connected by a high speed CPU local bus 124 through a bus controlled timing unit 138 to a memory control unit 150 which is further connected to a volatile random access memory (RAM) 158.

While the present invention is described hereinafter with particular reference to the system block diagram of FIG. 4B, it is to be understood at the outset of the description which follows, it is contemplated that the apparatus and methods in accordance with the present invention may be used with other hardware configurations of the motherboard. For example, the system processor could be an Intel, IBM, or Motorola microprocessor. These particular microprocessors can operate in a real addressing mode or a protected addressing mode. Each mode provides an addressing scheme for accessing different areas of the microprocessor's memory.

Returning now to FIG. 4B, CPU local bus 124 (comprising data, address and control components) provides for the connection of CPU 126, an optional math coprocessor 127, a cache controller 128, and a cache memory 130. Also coupled on CPU local bus 124 is a buffer 132. Buffer 132 is itself connected to a slower speed (compared to the CPU local bus) system bus 134, also comprising address, data and control components. System bus 134 extends between buffer 132 and a further buffer 136. System bus 134 is further connected to a bus control and timing unit 138 and a Direct Memory Access (DMA) unit 140. DMA unit 140 is comprised of a central arbitration unit 148 and a DMA controller 141. Buffer 136 provides an interface between the system bus 134 and an optional feature bus such as the Micro Channel bus 144, SCSI bus, NuBus, or PCI bus. "Micro Channel" is a registered trademark of International Business Machines Corporation. "NuBus" is a registered trademark of Apple Computer Corporation. Connected to bus 144 are a plurality of I/O slots 146a–146c for receiving adapter cards which may be further connected to an I/O device or memory. In the depicted example, I/O slot 146a has a hard disk drive connected to it; I/O slot 146b has a CD-ROM drive connected to it; and I/O slot 146c has a ROM on an adapter card connected to it. Other devices, such as a modem may be connected to an I/O slot. An arbitration control bus 142 couples the DMA controller 141 and central arbitration unit 148 to I/O slots 146 and diskette adapter 182. Also connected to system bus 134 is a memory control unit 150 which is comprised of a memory controller 152, an address multiplexer 154, and a data buffer 156. Memory control unit 150 is further connected to a random access memory as represented by RAM module 158. Memory controller 152 includes the logic for mapping addresses to and from CPU 126 to particular areas of RAM 158. While the personal computer system 110 is shown with a basic 4 megabyte RAM module, it is understood that additional memory can be interconnected as represented in FIG. 4B by the optional memory modules 160 through 164.

A further buffer 166 is coupled between system bus 134 and a motherboard I/O bus 168. Motherboard I/O bus 168 includes address, data, and control components respectively. Coupled along motherboard bus 168 are a variety of I/O adapters and other peripheral components such as display adapter 170 (which is used to drive an optional display 114), a clock 172, nonvolatile RAM 174 (hereinafter referred to as "NVRAM"), a RS232 adapter 176, a parallel adapter 178, a plurality of timers 180, a diskette adapter 182, a PC keyboard/mouse controller 184, and a read only memory (ROM) 186. The ROM 186 includes Basic Input/Output System which provides the user transparent communications between many I/O devices.

Clock 172 is used for time of day calculations. NVRAM 174 is used to store system configuration data. That is, the NVRAM will contain values which describe the present configuration of the system. For example, NVRAM 174 contains information which describe the capacity of a fixed disk or diskette, the type of display, the amount of memory, etc. Of particular importance, NVRAM 174 will contain data which is used to describe the system console configuration; i.e., whether a PC keyboard is connected to the keyboard/mouse controller 184, a display controller is available or the ASCII terminal is connected to RS232 adapter 176. Furthermore, these data are stored in NVRAM 174 whenever a special configuration program is executed. The purpose of the configuration program is to store values characterizing the configuration of this system to NVRAM 176 which are saved when power is removed from the system.

Connected to keyboard/mouse controller 184 are ports A and B. These ports are used to connect a PC keyboard (as opposed to an ASCII terminal) and mouse to the PC system. Coupled to RS232 adapter unit 176 is an RS232 connector. An optional ASCII terminal can be coupled to the system through this connector.

Specifically, personal computer system 110 may be implemented utilizing any suitable computer such as the IBM personal computer, Apple Macintosh computer, or Sun workstation, to name a few.

In accordance with a preferred embodiment of the present invention, dynamic and proportional sizing of GUI objects, such as controls, dialog boxes, and windows may be accomplished determining a percentage growth required for each control in a dialog box or window that contains translated text and from those percentage growths, determining the maximum percentage growth found for each control within the dialog box or window. Afterward, the maximum percentage growth is adjusted to insure that the dialog box will not expand beyond the capabilities of the display device. Next, for each control in the dialog, the position and size of the control is adjusted by the maximum percentage growth. Optionally, the expansion could be limited to only those controls that contain text. Such a procedure in effect, results in "zooming" in on the dialog box until either all the translated text is visible or the dialog box has reached the boundaries of the display device. A similar process may be employed to other types of windows containing controls.

Figures 1A, 1B:
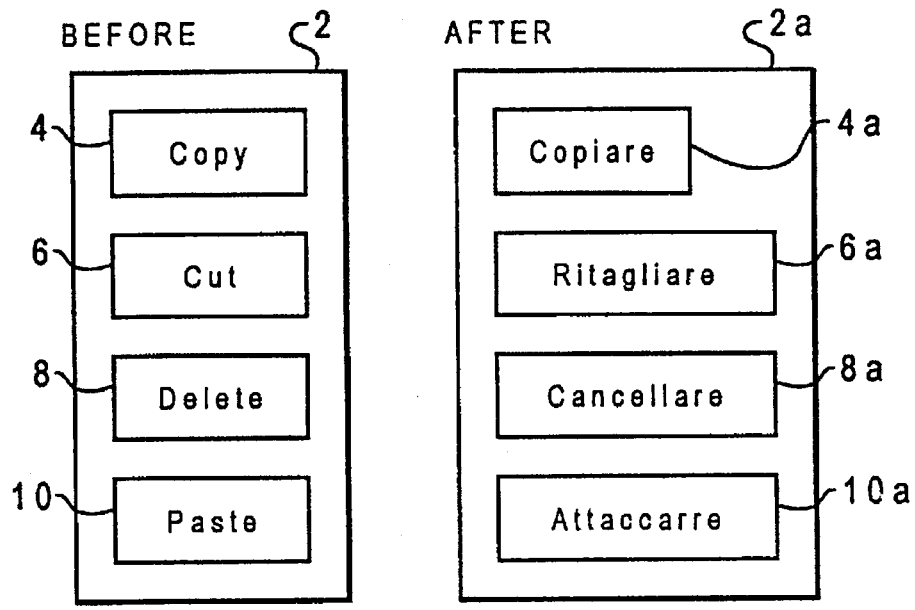
FIG. 1A and 1B are pictorial illustrations of changes in a dialog and associated controls using a known method.
Figures 5A, 5B:
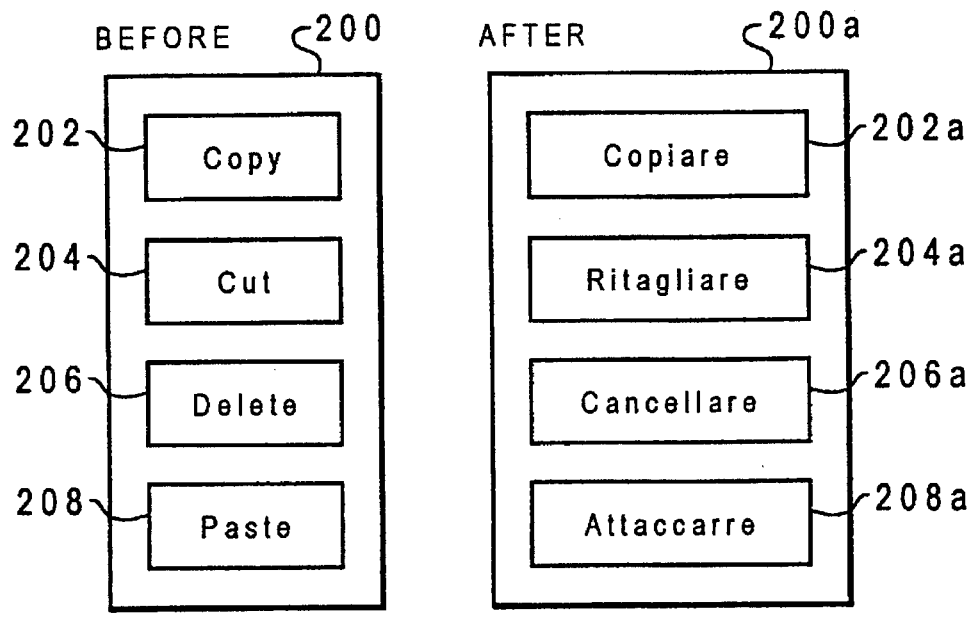
FIG. 5A and 5B are illustrations of a dialog box before and after replacement of text in accordance with a preferred embodiment of the present invention.
Figure 2A:
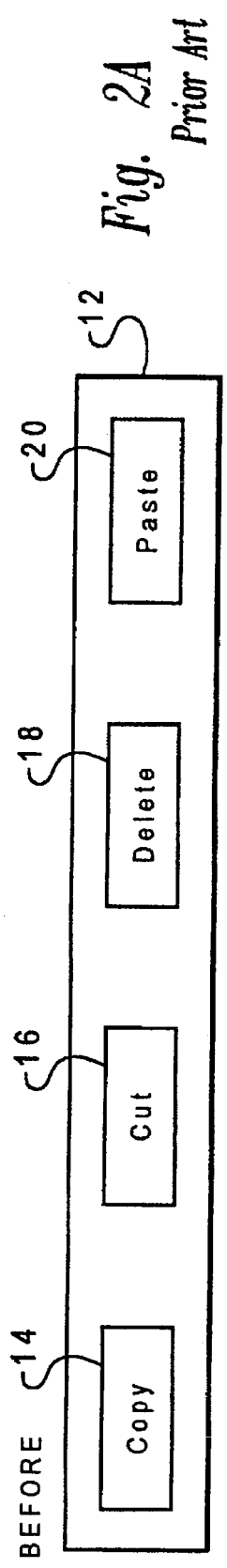
FIG. 2A and 2B are pictorial illustrations of changes in a dialog and associated controls using a known method.
Figure 2B:
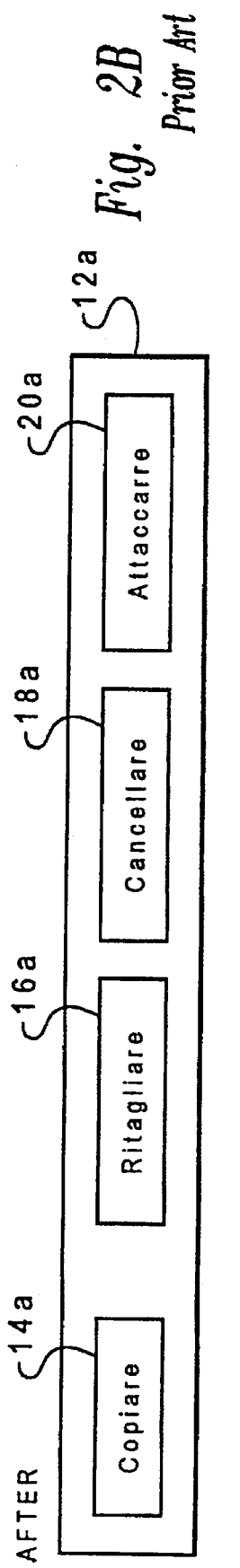
Figure 3A:
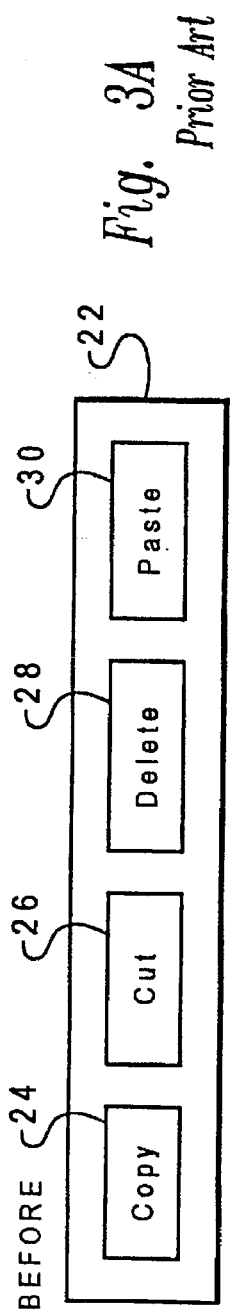
FIG. 3A and 3B are pictorial illustrations of changes in a dialog and associated controls using a known method.
Figure 3B:
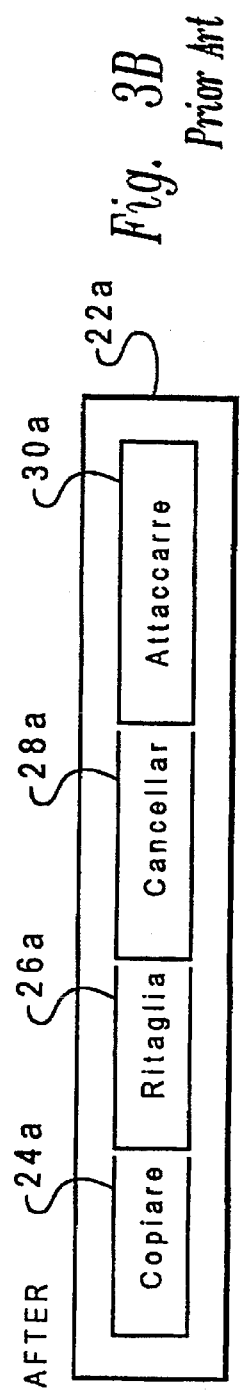

With reference now to FIG. 5A, dialog box 200 contains controls 202–208. In translating the text and expanding the controls according to the present invention, the controls are still aligned as can be seen in FIG. 5B. Items designated with a reference numeral including a letter correspond to items having the same reference numeral without a letter in a different figure. Dialog box 210 in FIG. 6A contains controls 212–218. FIG. 6B shows dialog box 210 along with controls 212–218 after translation of the text into another language. As can be seen, the space between controls 212–218 in FIG. 6B are still uniform and the controls do not overlap each other as in FIG. 2A–3B.

Figure 7B:
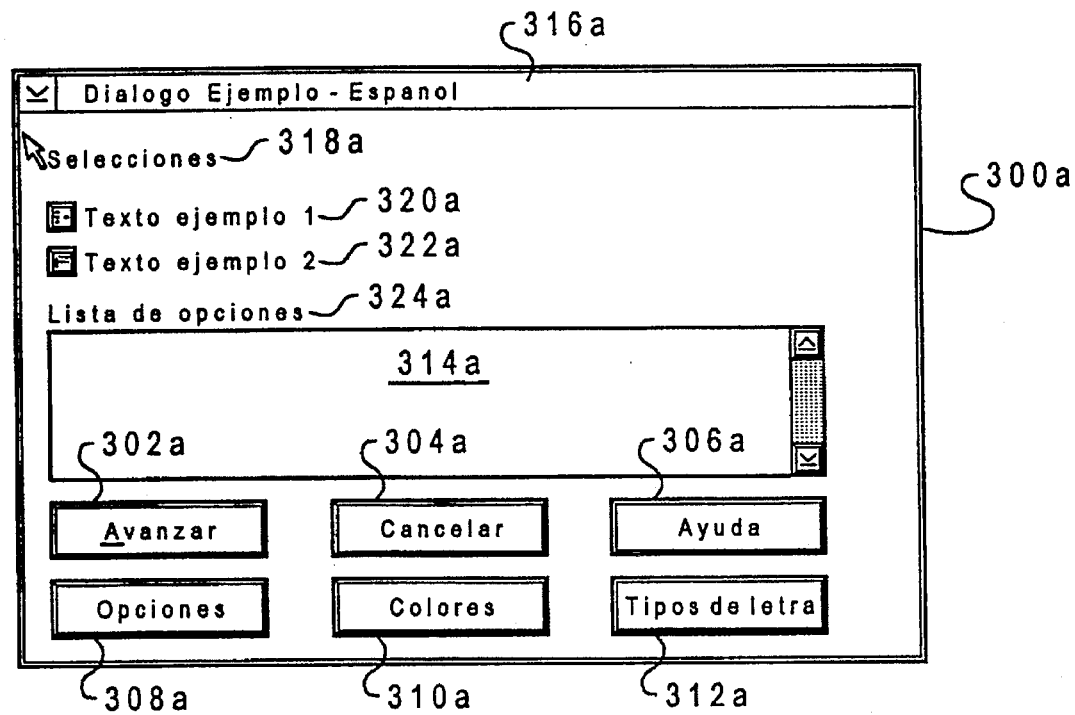
Figure 7C:
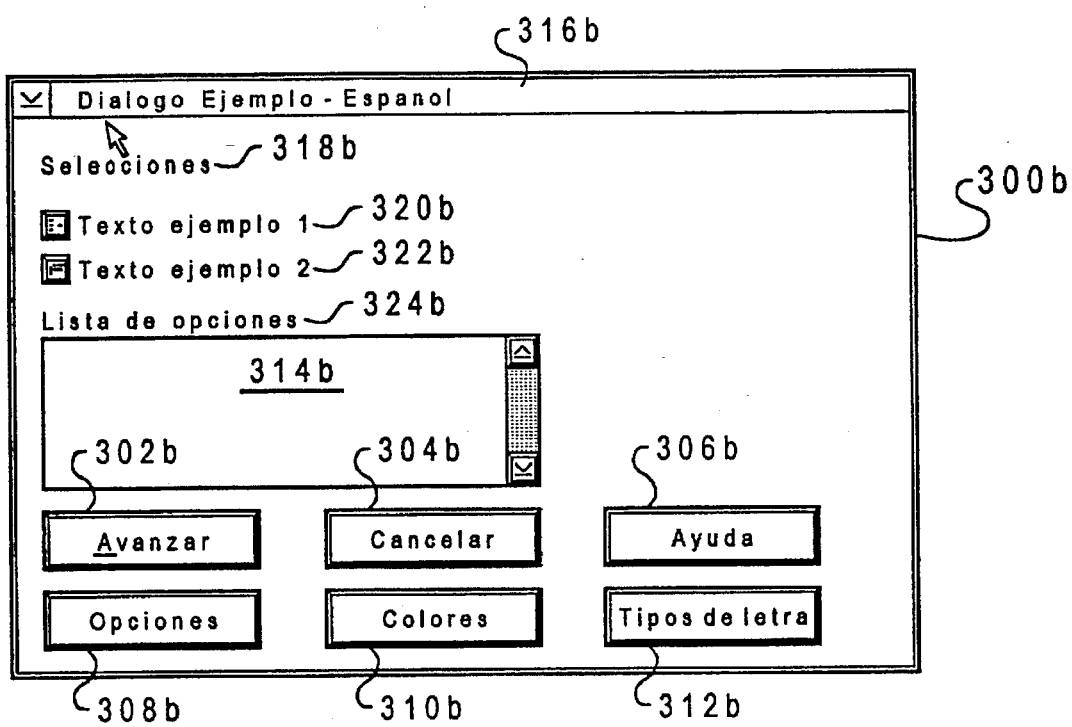

With reference now to FIG. 7A, a pictorial illustration of a dialog box 300 is depicted containing controls 302–312. Dialog box 300 also includes list box 314 and a window title 316. Dialog box 300 also includes a number of text fields 318–324. FIG. 7B shows dialog box 300a in an expanded form with translated text in controls 302a–312a, window title 316a and text fields 318a–324a. As can be seen in FIG. 7B, list box 314a has been expanded. In FIG. 7B all of the fields have been expanded, optionally, text fields may be the only field expanded in accordance with a preferred embodiment of the present invention. Such an example is shown in FIG. 7C in which list box 314b has not been expanded. Controls 302b–312b, window title 316b and text fields 318b–324b have been expanded to contain the translated text. In this depicted example only the text fields have been expanded.

The following flowcharts illustrate the processes followed by the present invention in providing proportionally sizing of GUI objects. The processes of the present invention may be implemented in a number of different operating systems.

OS/2 is an operating system that may be used in accordance with a preferred embodiment of the present invention. In particular, the present invention may be employed with a GUI such a Presentation Manager available from International Business Machines Corporation. "OS/2" and "Presentation Manager" are trademarks of International Business Machines Corporation.

Figure 8A:
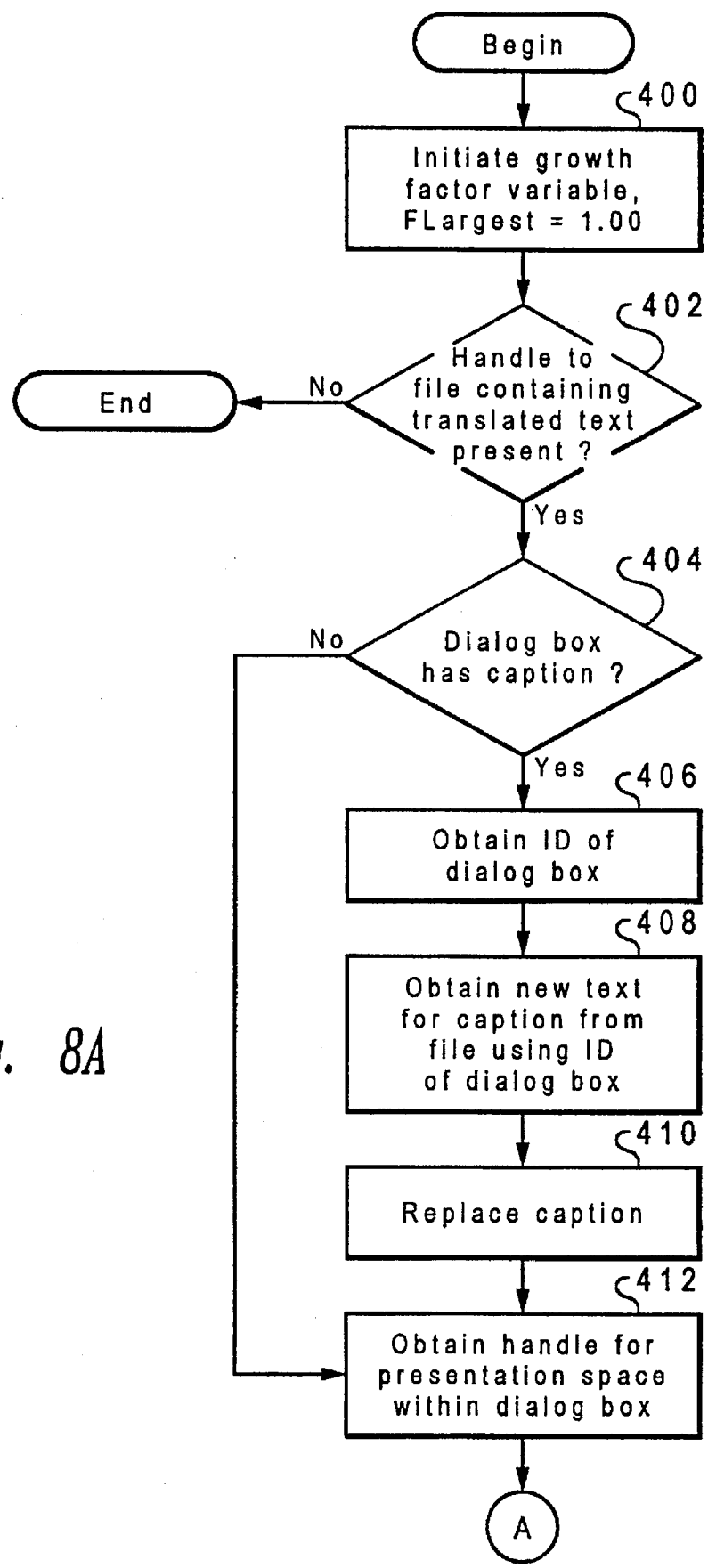
FIGS. 8A–8B are a flowchart of a process to replace translatable text within a dialog box as depicted in accordance with a preferred embodiment of the present invention.
Figure 8B:
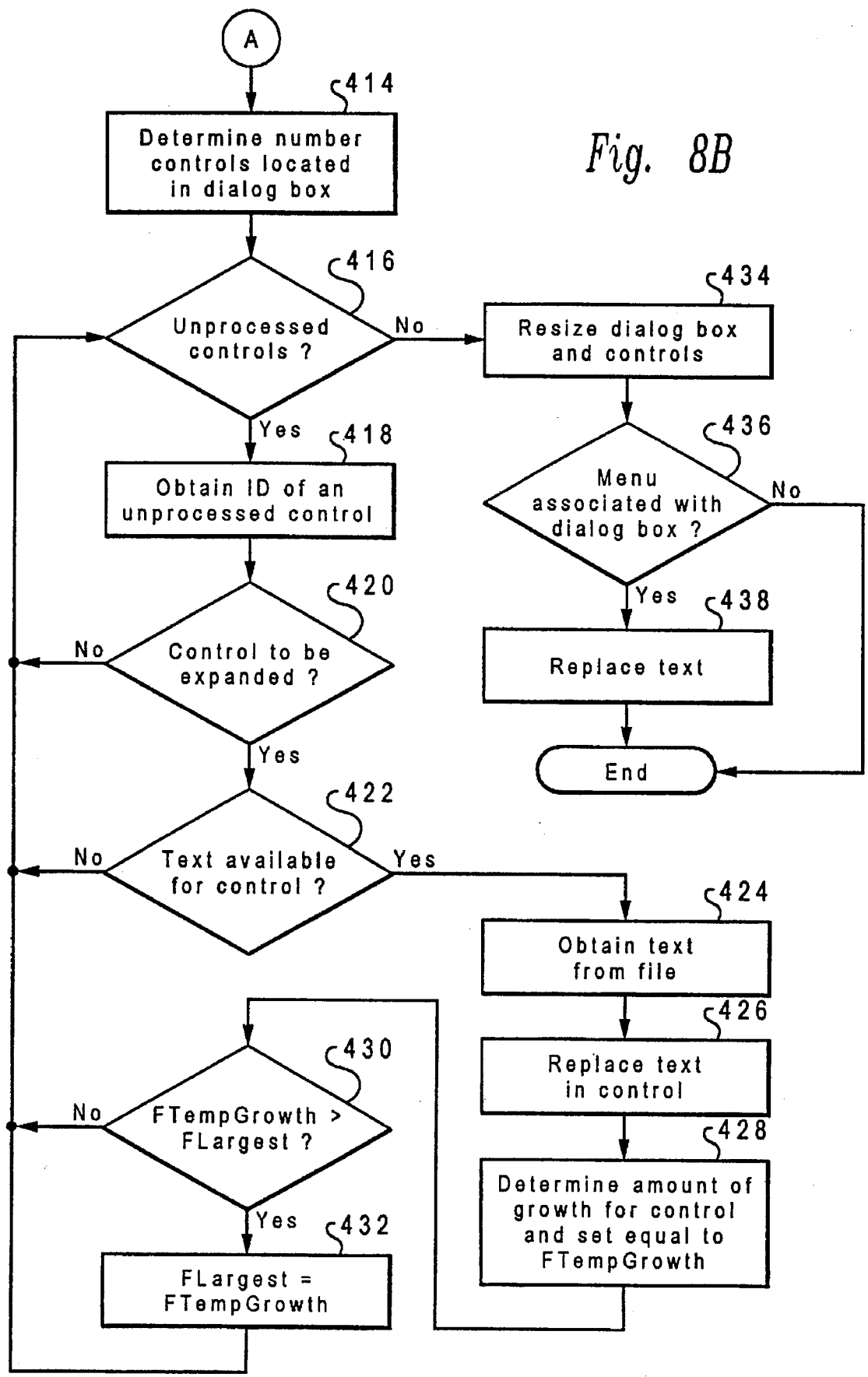

Turning now to FIGS. 8A–8B, a flowchart of a process to replace translatable text within a Presentation Manager dialog box is depicted in accordance with a preferred embodiment of the present invention. The process in FIGS. 8A–8B also resizes, i.e., expands or contracts, controls according to the text associated with the controls. The size of the dialog box itself may be adjusted. A control that has no text associated with it will not be grown in accordance with a preferred embodiment of the present invention. All controls will be re-positioned by the maximum percentage growth relative to the origin of the dialog box.

The process begins by initializing a growth factor variable, FLargest, by setting it equal to 1.00 (step 400). This variable, FLargest, is employed to track the largest proportional growth that should be employed in altering the size of a dialog box and the controls within the dialog box. The process then determines whether a handle to a file containing the translated text has been passed to the process (step 402). If a handle to the file has been passed to the process, then a determination of whether the window has a caption is performed (step 404). The caption is the text in the window title area of the dialog box.

If the dialog box contains a caption, the process then obtains the ID of the dialog box (step 406). This ID is employed as an index into the file containing the translated text. The process obtains the new text for the caption from the file using the ID of the dialog box (step 408). Next, the original caption of the dialog box is replaced with the new caption obtained from the file (step 410). The process then obtains a handle for the presentation space within the dialog box (step 412). "Presentation space" is the area within a dialog box. With reference again to step 404, the process proceeds directly to step 412 if the dialog box does not have a caption.

The number of controls located within the dialog box is determined (step 414). The process then determines if controls within the dialog box exist that have not been processed (step 416). A control has been processed if the control has been examined to see whether it is a control to be expanded and if it has been determined whether text should be replaced in the control. If additional controls exist that have not been processed, the ID of an unprocessed control is obtained (step 418). The selection of the particular unprocessed control may be made by a number of different ways known to those of ordinary skill in the art. For example, the control may be selected based on its location within the window title or based on some ordering of the controls within the dialog box. The ID of an unprocessed control is employed to obtain translated text from the file and to check the type of control with which the ID is associated.

The process then determines whether the control is one that is to be expanded (step 420). If the control has text and if the translated text will not be completely visible, the control will be expanded. If the control is one that is to be expanded, the process then determines whether text is available for the control (step 422). If text is available, the text is obtained from the file using the ID of the control (step 424). The existing text in the control is replaced with new text from the file (step 426).

The process then determines the amount by which the control needs to be resized (step 428). A more detailed description of determining the amount of resizing that a control needs is found below in the description of FIGS. 10A and 10B. The amount of resizing determined in step 428 is represented by a variable, FTempGrowth. It is possible that the control may not need to be expanded. This step basically determines how much the control needs to change to contain the translated text. The process then determines whether FTempGrowth is greater than FLargest (step 430). If FTempGrowth is greater than FLargest, FTempGrowth is set equal to FLargest (step 432). The process then returns to step 416 as described above. With reference again to step 430, if FTempGrowth is not greater than FLargest, the process also returns to step 416. The process also returns to step 416 from step 420 if the control is not a control that is to be control that is to be expanded or in step 422, the text for the control is not available.

Referring again to step 414, if additional controls are not present for processing, the process then resizes the dialog box and controls (step 434). More details on resizing dialogues are found in the description of FIG. 11 and more details of resizing controls are found in the description of the flowchart in FIG. 11; a more detailed description of resizing controls are found in the flowchart described in FIG. 12 below. The dialog box and controls are resized using the maximum growth determined for the controls stored in the variable FLargest. The process then determines whether a menu is associated with the dialog box (step 436). If a menu is associated with the dialog box, the process then replaces the text with translated text (step 438) with the process terminating thereafter. With reference again to step 436, if a menu is not associated with the dialog box, the process also terminates.

Figure 9:
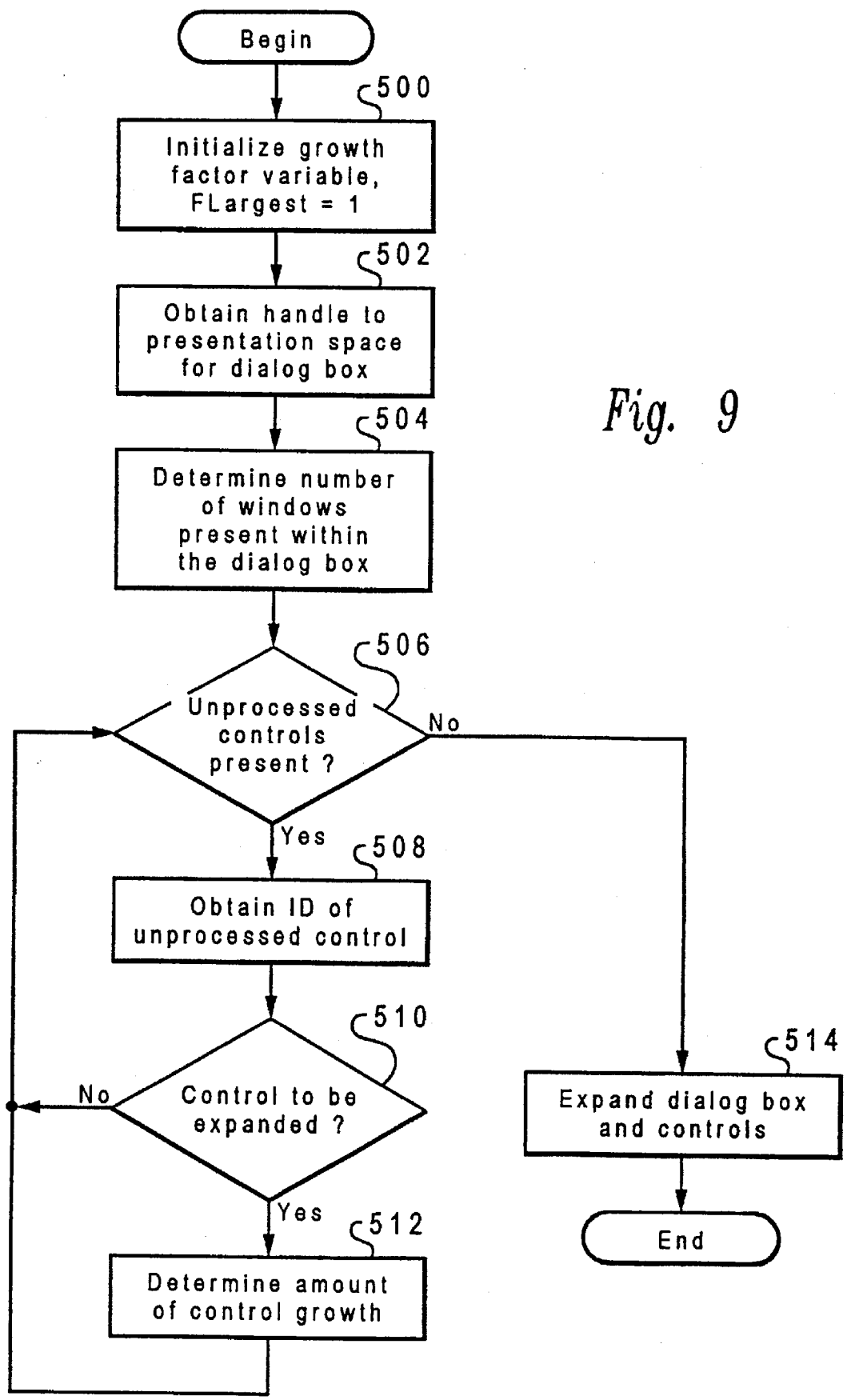
FIG. 9 is a flowchart of a process for expanding dialog boxes and controls depicted in accordance with a preferred embodiment of the present invention.

With reference now to FIG. 9, a flowchart of a process for expanding dialog boxes and controls is depicted in accordance with a preferred embodiment of the present invention. This particular process is employed if the dialog box and controls already contain replacement text. In such a situation, only an alteration of the dialog box and controls is required.

The process begins by initializing a growth factor variable, FLargest, by setting the variable equal to one (step 500). Thereafter, the process obtains a handle to the presentation space for the dialog box (step 502). The process then determines the number of windows present within the dialog box (step 504). Then, a determination is made as to whether controls are present that have been unprocessed (step 506). If additional controls are present for processing, the ID of an unprocessed control is obtained (step 508). The process then determines whether the control is one that should be expanded (step 510). If the control is one that should be resized, the process then determines the amount that the control needs to resized (step 512). More details on determining the amount of growth or expansion that a dialog box or control requires is described in more detail in the description of FIGS. 10A and 10B below. It is possible that the control may not need to be expanded at all.

Thereafter, the process returns to step 506. With reference again to step 510, if the control is not one to be resized, the process also returns to step 506. The process continues to process controls until no more unprocessed controls are present for processing. Then, the dialog box is expanded and the controls are expanded and repositioned (step 514) with the process terminating thereafter. More details on the growth or expansion of dialog boxes and controls are found in the description of the flowcharts depicted in FIGS. 11 and 12 below.

Figure 10A:
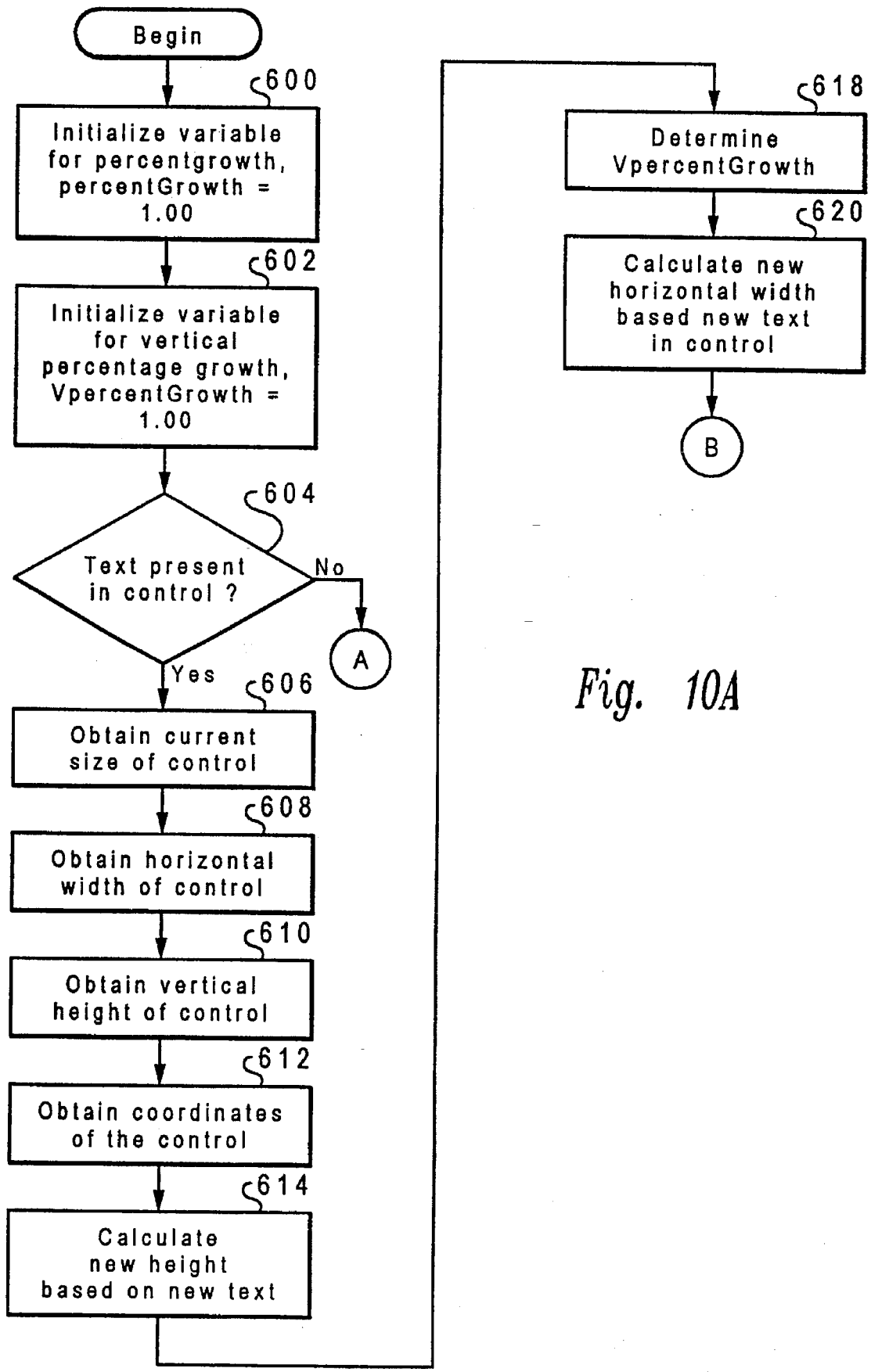
FIGS. 10A and 10B are a flowchart of a process for calculating the amount of expansion or growth that a control or dialog box requires is depicted in accordance with a preferred embodiment of the present invention.
Figure 10B:
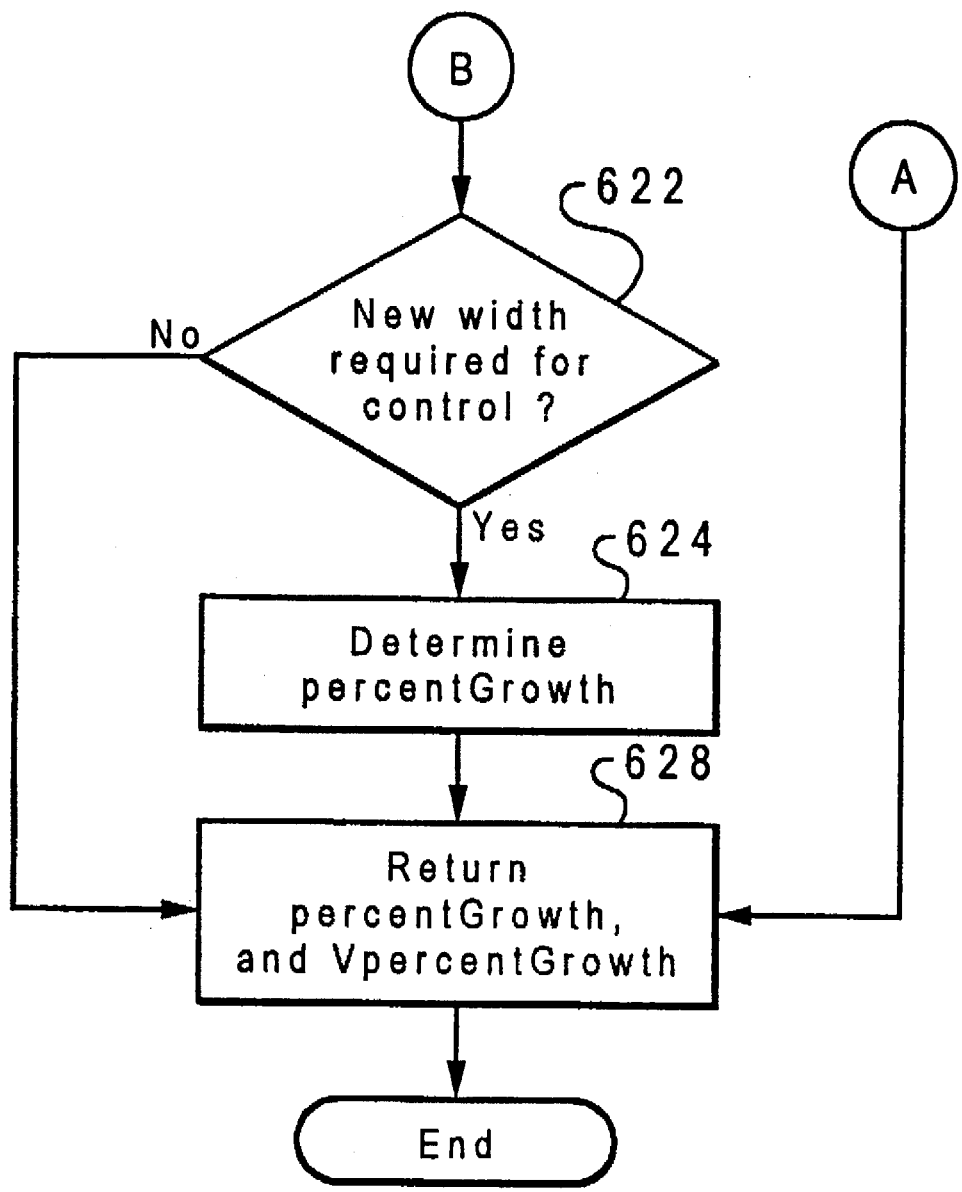

With reference now to FIGS. 10A and 10B, a flowchart of a process for calculating the amount of expansion or growth that a control or dialog box requires is depicted in accordance with a preferred embodiment of the present invention. The process depicted in this figure is a more detailed illustration of step 428 in FIG. 8B and of step 512 in FIG. 9. The process depicted in this flowchart assumes that translated text has been placed into the control prior to starting this process. In addition, a control that does not contain text or return an indication that the control does not require a change in size.

The process begins by initializing a variable, percentGrowth, for the percent growth (step 600). This variable represents the horizontal percent growth and is used to set FLargest. A variable for vertical percentage growth, VpercentGrowth also is initialized (step 602). A determination is made as to whether text is present in the control (step 604). If text is present in the control, the process then obtains the current size of the control (step 606). The process then obtains the horizontal width of the control (step 608) and the vertical height of the control (step 610). Afterwards, the coordinates of the control are obtained (step 612). A new height is calculated based on the new text (step 614). The process determines the vertical percentageGrowth (step 616). The Vertical percentgrowth, VpercentageGrowth, is calculated as follows:

$$VpercentGrowth = 1 + \frac{new\ height - current\ height}{current\ height}.$$

A new horizontal width is calculated for the control based on the new text within the control (step 620).

The process then determines whether a new width is required for the control (step 622). Some controls do not need to be resized. For example, multiline edit fields are not resized. If a new width is required, the percent growth necessary for the new width is determined (step 624). The horizontal percent growth, percentGrowth, is determined as follows:

$$percentGrowth = 1 + \frac{new\ width - current\ width}{current\ width}.$$

After determining the horizontal percent growth, the process returns the horizontal percent growth, percentGrowth, and the vertical percent growth, VpercentGrowth (step 626) with the process terminating thereafter. Referring again to step 622, if a new width is not required, the process then proceeds to step 626. Referring again to step 604, if text is not present for the control, the process then returns the percent growth as depicted in step 626. In such a situation, the value of the percentgrowth is one (FLargest=1), meaning that no adjustment of the control occurs.

Figure 11:
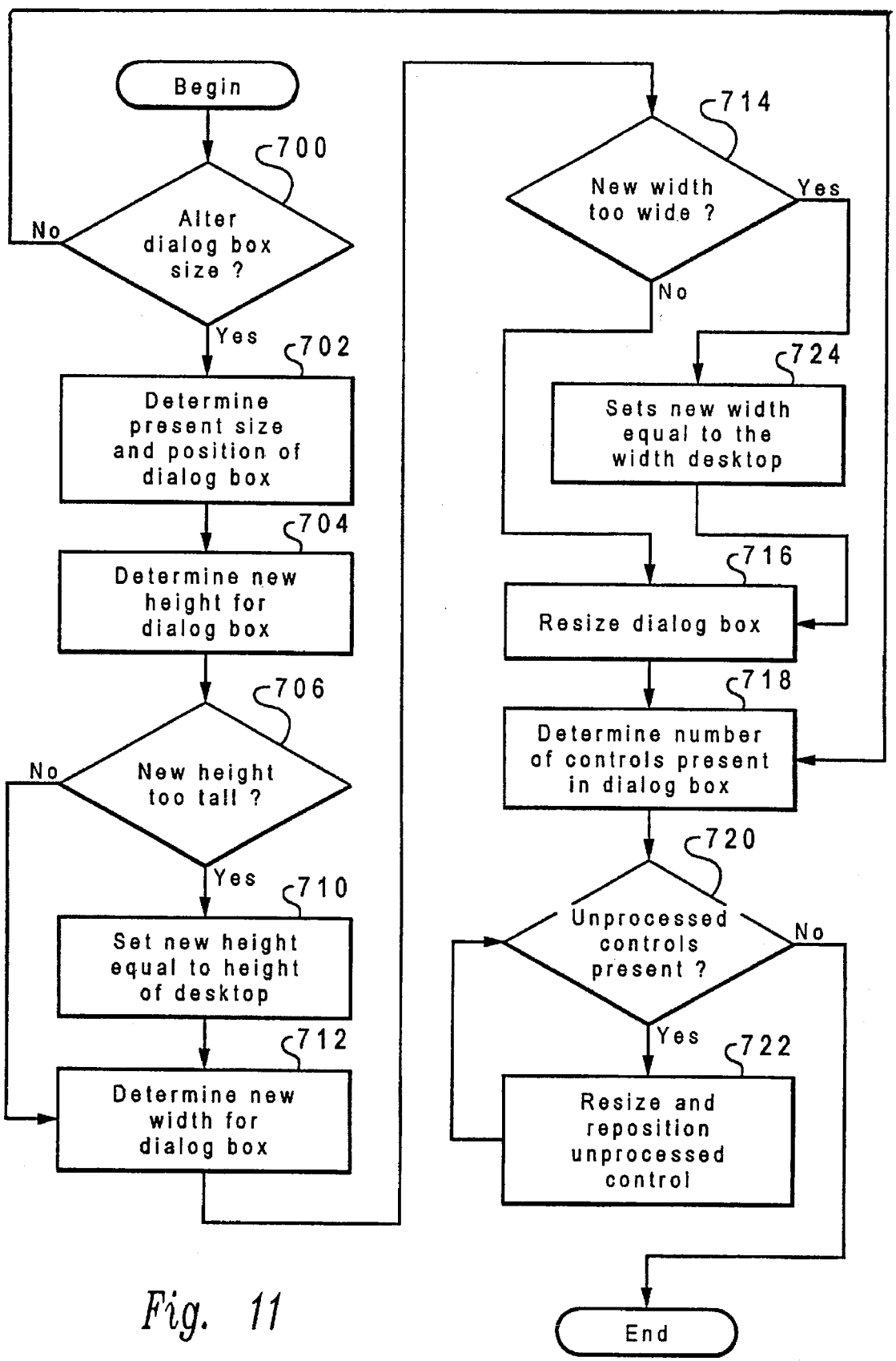
FIG. 11 is a flowchart of a process for resizing a dialog box as depicted in accordance with a preferred embodiment of the present invention.

Referring now to FIG. 11, a flowchart of a process for growing a dialog box is depicted in accordance with a preferred embodiment of the present invention. This process assumes that translated text has already been loaded into the control prior to the initiation of this process.

The process in FIG. 11 begins by determining whether the dialog box needs to change size (step 700). This is determined by checking the variable FGrowthFactor. The value for the variable FGrowthFactor is set equal to the value for the variable FLargest as determined in FIGS. 10A and 10B. If the variable FGrowthFactor is equal to one, then the dialog box does not need to be expanded. If the dialog box does need to grow or expand, the process then determines the present size and position of the dialog box containing the controls (step 702). A new height is determined for the dialog box (step 704). Thereafter, a determination is made as to whether the new height for the dialog box is too tall (step 706). If the height is too tall, the process sets the new height equal to height of the desktop (step 710).

A new width represented by variable, newWidth, is calculated for the dialog box by multiplying the present width of the dialog box by FGrowthFactor (step 712). A determination is then made as to whether the new width, newWidth, of the dialog box will be too wide (step 714). In this determination, a dialog box is too wide if it is wider than the width of the display in which the dialog box is displayed. In accordance with a preferred embodiment of the present invention, it is desirable to limit the amount of growth such that the resized dialog box will not be expanded beyond the capabilities of the display device in the data processing system. Additionally, the resizing may be limited to a "desktop", which is typically known as an on-screen work area that employs icons and menus to simulate the top of a desk, If the width of the dialog box is not too wide, the process then resizes the dialog box using the new width, new width (step 716).

The process then determines the number of controls present within the dialog box (step 718). The process then determines whether controls are present that have not been processed (step 720). An unprocessed control in FIG. 11 is a control that has not been resized. If additional controls are present for processing, an unprocessed control is then resized and repositioned (step 722). A more detailed explanation of resizing controls in step 722 is found in FIG. 12 below. The process then returns to step 720 until no more controls are present for processing. When no additional unprocessed controls are present for processing, the process then terminates. Referring back to step 700, if the dialog box is not to be altered the process proceeds directly to step 718.

With reference again to step 714, if the new width of the dialog box would be too wide, the process then sets the new width, newWidth, equal to the width of the desktop (step 724) with the process then proceeding to step 716 as previously described.

Figure 12:
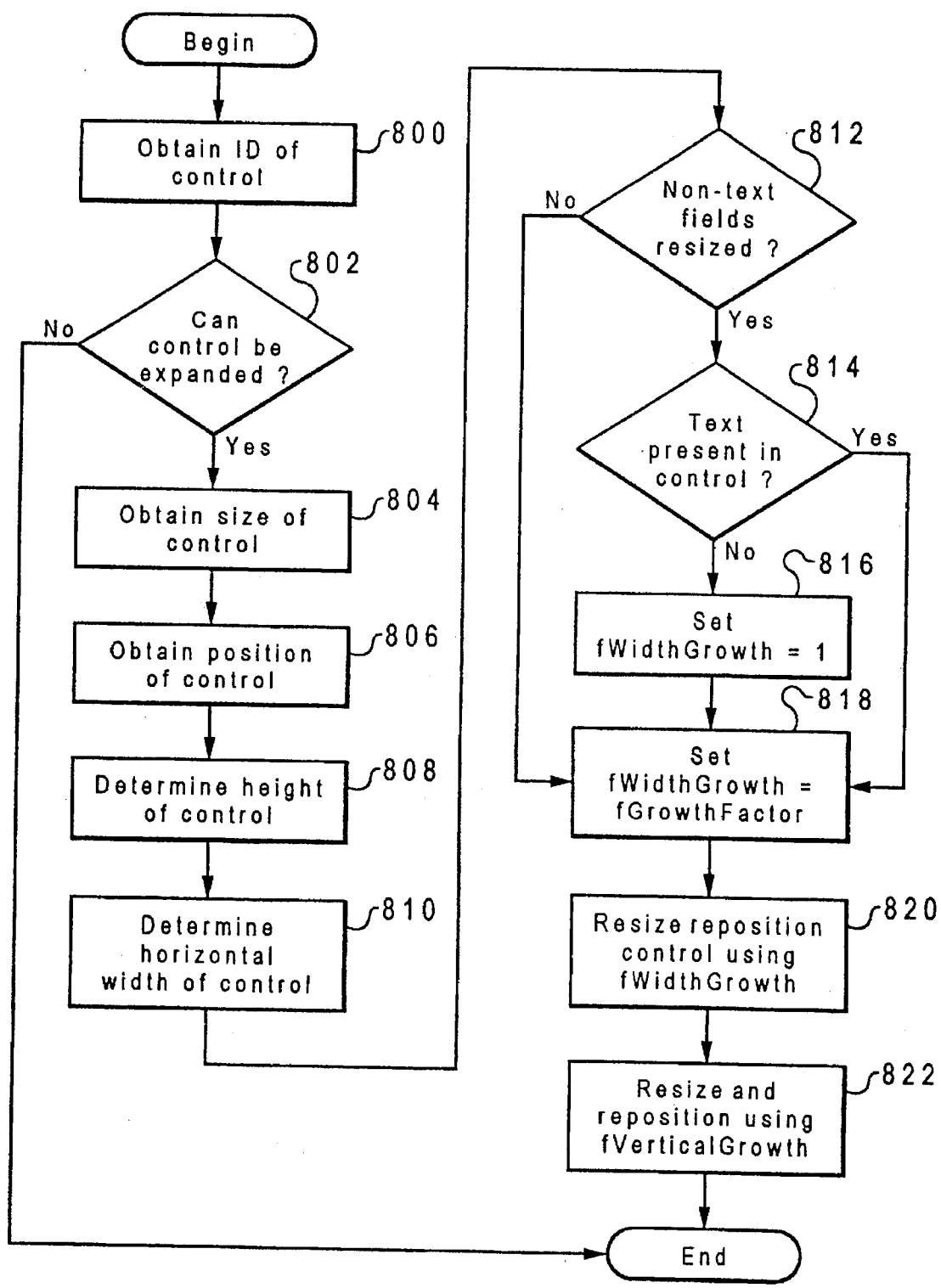
FIG. 12 is a flowchart of a process for resizing a control in a dialog box as depicted in accordance with a preferred embodiment of the present invention.

With reference now to FIG. 12, a flowchart of a process for resizing a control in a dialog box is depicted in accordance with a preferred embodiment of the present invention. This process is employed to increase the width of a control by specified growth factor. The process also may be employed to decrease or shrink the size of a control in accordance with a preferred embodiment of the present invention. The process begins by obtaining the ID of the control (step 800). Thereafter, a determination is made as to whether the control is one that can be expanded (step 802). If the control is one that can be expanded, the size of the control is obtained (step 804). The process then obtains the position of the control (step 806). A height of the control is determined from the size of the control (step 808). The process then determines a horizontal width of the control using the size of the control (step 810).

Thereafter, the process determines whether non-text fields should be resized (step 812). If non-text fields are not to be resized, the process then determines whether text is present in the control (step 814). If text is absent from the control, the process then sets fWidthGrowth equal to 1 (step 816). Setting fWidthGrowth equal to 1 results in no growth in the control. The process then sets fWidthGrowth equal to the FGrowthFactor (step 818). The value for the variable FGrowthFactor was determined in the process depicted in FIG. 11. The process then resizes and repositions the control using fWidthGrowth (step 820). The control also is resized and repositioned using fVerticalGrowth (step 822) with the process terminating thereafter. With reference again to step 802, if the control is not one that can be grown or expanded, the process also terminates.

With reference again to step 814, if text is present in the control, the process proceeds directly to step 818 as previously described. Also, in step 812, if non-text fields should be resized, the process also proceeds directly to step 818.

The processes of the present invention shown in FIGS. 5-12 may be implemented by those of ordinary skill in the art within the data processing system depicted in FIGS. 4A and 4B. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, RAM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

The present invention provides an improved method for proportional sizing of GUI objects in a data processing system. According to the present invention, controls remain aligned when text is translated. Additionally, uniform spaces are maintained between controls in the dialog box. Also, the present invention prevents controls from overlaying each other such that dialog box designers do not need to be concerned with the translation space as previously required. Additionally, the expanded or grown dialog boxs maintains the look and feel of the original ones. Although the depicted embodiment shows a dialog box, other types of windows containing controls may be processed according to the present invention.

Appendix A contains code for the processes of the present invention in C, including those described in the flowcharts. Appendix B contains the headers for the various processors illustrated in Appendix A. The implementation of the code in Appendices A and B are for use with OS/2 and Presentation Manager, which are available from International Business Machines Corporation.

While the invention has been particularly shown and described with reference to a preferred embodiment, it will be understood by those skilled in the art that various changes in form and detail may be made therein without departing from the spirit and scope of the invention.

APPENDIX A

```
/****************************************************************/
/* Object Code Only (OCO) Source Materials                      */
/****************************************************************/

/****************************************************************/
/* Copyright = 5763-XA1 (C) Copyright IBM Corp 1993, 1994       */
/*   All rights reserved.                                        */
/*   Refer to copyright instructions form number G120-2083.      */
/****************************************************************/

/****************************************************************
*
* MODULE:
*    CWBNLDLG.C
*
* ENTRY POINTS:
*    cwbNL_LoadDialogStrings
*    cwbNL_SizeDialog
*    cwbNL_CalcDialogGrowth
*    cwbNL_GrowDialog
*    cwbNL_GrowControl
*    cwbNL_CalcControlGrowth
*
* IMPLEMENTATION NOTES:
*
*    This module contains the routines necessary to replace the
*    translatable text (caption and control names) within
*    a Presentation Manager dialog box.
*
*    This module will also expand/contract controls according to
*    the text associated with them.  The size of the dialog box
*    frame will also be adjusted.  A control that has no text
*    associated with it will not be shrunk.
*
****************************************************************/ define INCL_ERRORS
define INCL_PM
#define INCL_WIN
#include <os2.h>
#include <stdlib.h>
#include <memory.h>
#include "cwbnldlg.h"

/****************************************************************
*
* API:
*
* IMPLEMENTATION NOTES:
*
****************************************************************/
#pragma handler(cwbNL_LoadDialogStrings)
unsigned int CWB_ENTRY _Export cwbNL_LoadDialogStrings(
```

```
    HMODULE hMriModule,
    HWND    hWnd,
    USHORT  usMenuID,
    HMODULE hMenuLibrary,
    cwb_Boolean    fExpandEmpty)
{
  HPS     hPS;
  HENUM   hEnum;
  HWND    hWndNext;
  int     nCaptionLength;
  HWND    hDialogMenu;
  USHORT  usID;
  SWP     swpParent;
  SWP     swpDialog;
  char    szText[1610];
  SHORT   nChars;
  unsigned int usRC;
  float   fTempGrowth;

// assume all is well
  int nReturnCode = 0;

// Initialize growth factor variable
  float fLargest = 1.00;

// If an MRI handle was passed in
  if (hMriModule != 0)
  {

// Determine if the window has a caption coming in
    nCaptionLength = WinQueryWindowTextLength(hWnd);

if (nCaptionLength > 0)
    {
      // Get the ID of the dialog window
      usID = WinQueryWindowUShort(hWnd, QWS_ID);

// Pull the caption string out of the MRI file using the ID of
      // the window
      nChars = WinLoadString(0,hMriModule,usID,sizeof(szText),szText);

// Set the caption of the dialog window
      WinSetWindowText(hWnd, szText);
    }

// Get a handle to the presentation space for the window
    hPS = WinGetPS(hWnd);

// Enumerate the windows within the frame hWnd
    hEnum = WinBeginEnumWindows(hWnd);

// While there are more control windows to process
    while ((hWndNext = WinGetNextWindow(hEnum)) != 0)
```

```
{
    // Get the ID of the control
    usID = WinQueryWindowUShort(hWndNext, QWS_ID);

// if its not a FCF_ control window, (otherwise ignore it)
    if (!(usID & 0x8000))
    {

// Determine if there is text for the control
        nChars = WinQueryWindowText(hWndNext,sizeof(szText),szText);
        // if text available
        if (nChars > 0)
        {
            // Get the MRI from the MRI file using the ID of the
control
            nChars = WinLoadString(0,hMriModule,usID,sizeof(szText),szText);

WinSetWindowText(hWndNext, szText);

}

// Determine the amount the control needs to grow, if any
        fTempGrowth = cwbNL_CalcControlGrowth(hWndNext, hPS);

if (fTempGrowth > fLargest)
        {
            fLargest = fTempGrowth;
        }
    }
}
WinEndEnumWindows(hEnum);

WinReleasePS(hPS);

// Resize the dialog and controls
usRC = cwbNL_GrowDialog(hWnd, fLargest, fExpandEmpty);

if (usMenuID != 0)
{
    hDialogMenu = cwbNL_LoadMenu(
        hWnd,
        hMenuLibrary,
        usMenuID,
        hMriModule);

if (hDialogMenu == 0)
    {
        nReturnCode = CWBNL_DLG_MENU_LOAD_ERROR;
    }
}
}
else // report MRI handle = NULL error
{
    nReturnCode = CWBNL_DLG_INVALID_HANDLE;
```

```
      }
      return nReturnCode;
}

/****************************************************************
 *
 * API:
 *   cwbNL_SizeDialog
 *
 * IMPLEMENTATION NOTES:
 *   Perform these steps:
 *    - call cwbNL_CalcDialogGrowth
 *    - call cwbNL_GrowDialog
 *
 ****************************************************************/
#pragma handler(cwbNL_SizeDialog)
unsigned int CWB_ENTRY _Export cwbNL_SizeDialog(
    HWND hWnd,
    cwb_Boolean fExpandEmpty)
{
  // Calculate dialog growth and size the dialog.
  return cwbNL_GrowDialog(
      hWnd,
      cwbNL_CalcDialogGrowth(hWnd),
      fExpandEmpty);
}

/****************************************************************
 *
 * API:
 *   cwbNL_CalcDialogGrowth
 *
 * IMPLEMENTATION NOTES:
 *
 ****************************************************************/
#pragma handler(cwbNL_CalcDialogGrowth)
float CWB_ENTRY _Export cwbNL_CalcDialogGrowth(HWND hWnd)
{
  HWND   hEnum;
  HWND   hWndNext;
  float  fCtlGrowth;
  HPS    hPS;
  USHORT usID;

// Initialize growth factor variable
  float  fLargest = 1.00;

// Get a handle to the presentation space for the window
  hPS = WinGetPS(hWnd);

// Enumerate the windows within the frame hWnd
  hEnum = WinBeginEnumWindows(hWnd);

// While there are more control windows to process
```

```
   while ((hWndNext = WinGetNextWindow(hEnum)) != 0)
   {
      // Get the ID of the control
      usID = WinQueryWindowUShort(hWndNext, QWS_ID);

// if its not a FCF_ control window, (otherwise ignore it)
      if (!(usID & 0x8000))
      {
         // Determine the amount the control needs to grow, if any
         fCtlGrowth = cwbNL_CalcControlGrowth(hWndNext, hPS);

if (fCtlGrowth > fLargest)
         {
            fLargest = fCtlGrowth;
         }
      }
   }
   WinEndEnumWindows(hEnum);

WinReleasePS(hPS);

return fLargest;
}

/****************************************************************
 *
 * API:
 *    cwbNL_CalcControlGrowth
 *
 * IMPLEMENTATION NOTES:
 *       It is assumed that the translated text has been loaded
 into the
 *       control prior to calling this function.
 *
 *       A control that does not contain text will not return a
 1.00
 *       growth factor.  This means that it does not need to change
 size.
 *
 * Parameters:
 *       HWND - window handle of the control to calculate the
 growth
 *              factor for.
 *       HPS  - presentation space.  Used for GpiTextBox call to
 determine
 *              extent needed for the translated string in the
 control.
 *
 * Returns:
 *       float - +/- growth needed to contain the string for the
 control.
 *
 ****************************************************************/
#pragma handler(cwbNL_CalcControlGrowth)
float CWB_ENTRY _Export cwbNL_CalcControlGrowth(
```

```
    HWND  hWnd,
    HPS   hPS)
{
  long   nChars;
  char   szText[161];
  RECTL  rctDialog;
  long   lCurWidth;
  long   lNewWidth;
  ULONG  ulWindowStyle;
  POINTL aptTextBox[TXTBOX_COUNT];
  char   className[21];

int ADDITIONAL_X_OFFSET = 10;

// Initialize growth to return
  float  percentGrowth = 1.00;

// Determine if there is text for the control
  nChars = WinQueryWindowText(hWnd, sizeof(szText), szText);

// If there is text in the control
  if (nChars > 0)
  {
    // Get the rectangle for the current control
    WinQueryWindowRect(hWnd, &rctDialog);

// Get the coordinates of the box needed to contain the text
    GpiQueryTextBox(hPS,   nChars,   szText,    TXTBOX_COUNT,
aptTextBox);

// Get the horizontal width of the control
    lCurWidth = rctDialog.xRight - rctDialog.xLeft;

// Calculate the new horizontal width needed for the control
    lNewWidth = aptTextBox[TXTBOX_TOPRIGHT].x -
                aptTextBox[TXTBOX_TOPLEFT].x;

// Get the class name of the control
    WinQueryClassName(hWnd, 20, className);

// Check if the class name for the control is WC_BUTTON (#3)
    if (strcmp(className, "#3") == 0)
    {
      // Get the style of the control
      ulWindowStyle = WinQueryWindowULong(hWnd,
                                          QWL_STYLE);

// Get the style set up to check for the button style
      ulWindowStyle &= 0xFL;

// Only put in pad space for pushbuttons
      if (ulWindowStyle == BS_PUSHBUTTON)
      {
        // Add in the pad space for a pushbutton control
        lNewWidth += ADDITIONAL_X_OFFSET;
      }
```

```
        }
        else if (strcmp(className, "#10") == 0)   // Check for MLE
        {
            // Get the style of the control
            ulWindowStyle = WinQueryWindowULong(hWnd,
                                                QWL_STYLE);

// Keep the size of the MLE the same if it has word-wrap
on
            if (ulWindowStyle & MLS_WORDWRAP)
            {
                // Set up the values so the MLE won't force growing the
controls
                lNewWidth = lCurWidth;
            }
        }

// Determine if control is same size as text
        if (lNewWidth != lCurWidth)
        {
           percentGrowth = (float)(((float)lNewWidth -
                           (float)lCurWidth) / (float)lCurWidth);

percentGrowth = percentGrowth + 1.00;
        }
    } return percentGrowth;
}

/******************************************************************
 *
 * API:
 *    cwbNL_GrowDialog
 *
 * IMPLEMENTATION NOTES:
 *
 * Parameters:
 *       HWND - window handle of the window owning the controls.
 *       float - multiplication factor for growing or shrinking the
dialog box.
 *                ie. 1.00 = Stay same size   1.50 = 1 1/2 times
original size
 *       cwb_Boolean - TRUE or FALSE.
 *          TRUE = All controls with grow/shrink.
 *          FALSE = text fields will grow/shrink,
 *                  non-text fields will not.
 *
 * Returns:
 *       USHORT - return code
 *
 * Purpose:
 * Notes:
 *        It is assumed that the translated text has been loaded
into the
```

```
 *      control prior to calling this function.
 *
 **************************************************************/
#pragma handler(cwbNL_GrowDialog)
unsigned int CWB_ENTRY _Export cwbNL_GrowDialog(
    HWND    hWnd,
    float   fGrowthFactor,
    cwb_Boolean   fExpandEmpty)
{
  SWP     swpParent;
  HWND    hEnum;
  HWND    hWndNext;
  LONG    maxWidth;
  SHORT   newWidth;

// Determine if the size even needs to change
  if (fGrowthFactor != 1.00)
  {
    // Query the size and position of the dialog window
    WinQueryWindowPos(hWnd, &swpParent);

// Determine width of the desktop
    maxWidth = WinQuerySysValue(HWND_DESKTOP,
                                SV_CXSCREEN);

// Calculate how wide the window is supposed to grow
    newWidth = swpParent.cx * fGrowthFactor;

// Only allow the window to be as wide as the desktop.
    if (newWidth > maxWidth)
    {
      newWidth = maxWidth;
    }

// Resize the main window of the dialog,
    WinSetWindowPos(
        hWnd,
        0,
        0, // do not change the horizontal position
        0, // do not change the vertical position
        (SHORT) newWidth,
        (SHORT) swpParent.cy,
        SWP_SIZE);

// Enumerate the windows within the frame hWnd
    hEnum = WinBeginEnumWindows(hWnd);

// While there are more control windows to process
    while ((hWndNext = WinGetNextWindow(hEnum)) != 0)
    {
      cwbNL_GrowControl(hWndNext, fGrowthFactor, fExpandEmpty);
    }

WinEndEnumWindows(hEnum);
  }
}
```

```
   return CWB_OK;
}

/*****************************************************************
 *
 * API:
 *    cwbNL_GrowControl
 *
 * IMPLEMENTATION NOTES:
 *
 * Parameters:
 *      HWND - window handle of the control
 *      float - multiplication factor for growing/shrinking the
 dialog box.
 *              ie. 1.00 = Stay same size    1.50 = 1 1/2 times
 original size
 *      cwb_Boolean - TRUE or FALSE.
 *         TRUE  = All controls with grow/shrink.
 *         FALSE = text fields will grow/shrink,
 *                 non-text fields will not.
 *
 * Returns:
 *    USHORT - return code
 *
 * PURPOSE:
 *     Increase the width of a control by the specified growth
 factor.
 *
 * NOTES:
 *
 *****************************************************************/
#pragma handler(cwbNL_GrowControl)
unsigned int CWB_ENTRY _Export cwbNL_GrowControl(
    HWND    hWnd,
    float   fGrowthFactor,
    cwb_Boolean    fExpandEmpty)
{
   float   fWidthGrowth;
   long    lCurHeight;
   long    lCurWidth;
   RECTL   rctDialog;
   USHORT  usID;
   SWP     swpDialog;   // Set Window Position (SWP) structure
   INT     nChars;
   char    szText[161];

// Get the ID of the control
   usID = WinQueryWindowUShort(hWnd, QWS_ID);

// if its not a FCF_ control window,  (otherwise ignore it)
   if (!(usID & 0x8000))
   {
      // Get the rectangle for the current control
```

```
      WinQueryWindowRect(hWnd, &rctDialog);

// Get the size and position of the current control
      WinQueryWindowPos(hWnd, &swpDialog);

// Get the height of the control
      lCurHeight  = rctDialog.yTop - rctDialog.yBottom;

// Get the horizontal width of the control
      lCurWidth = rctDialog.xRight - rctDialog.xLeft;

// Determine if the user does NOT want us to resize non-text
      // fields
      if (!fExpandEmpty)
      {
        // Determine if there is text for the control
        nChars = WinQueryWindowText(hWnd, sizeof(szText), szText);

// if the control does not contain text
        if (nChars == 0)
        {
          fWidthGrowth = 1.00;
        }
        else
        {
          fWidthGrowth = fGrowthFactor;
        }
      }
      else                                       // Fix for expansion
problems
      {
        fWidthGrowth = fGrowthFactor;      // PTR P0001356
      }

// Set the size and position of the control
      WinSetWindowPos(
          hWnd,
          0,
          swpDialog.x * fGrowthFactor,  // change the horizontal
origin
          swpDialog.y,                  // same vertical position
          lCurWidth * fWidthGrowth,     // change the width
          lCurHeight,                   // same height
          SWP_SIZE                      // change the size and
origin
        ] SWP_MOVE                      // change the origin
        ] SWP_NOADJUST );               // tell PM not to send
WM_ADJUSTWINDOWPOS
  } return CWB_OK;
}

/****************************************************************
 *
```

```
 *  INTERNAL ROUTINE:
 *     GetMenuItemString
 *
 *  IMPLEMENTATION NOTES:
 *

*****************************************************************/ void GetMenuItemString(
    HWND hMenu,
    unsigned short usID,
    HMODULE hMriModule)
{
  MPARAM mpResult;
  char szText[810];
  int nChars;

mpResult = WinSendMsg(
      hMenu,
      MM_QUERYITEMTEXT,
      MPFROM2SHORT(usID, sizeof(szText)),
      (MPARAM) szText);

// get number of characters
  nChars = SHORT1FROMMP(mpResult);

// does the menu item have any text?
  if (nChars > 0)
  {
    // Load the string from the MRI module
    nChars = WinLoadString(
        0,
        hMriModule,
        usID,
        sizeof(szText),
        szText);

// Replace the string in the menu item
    mpResult = WinSendMsg(
        hMenu,
        MM_SETITEMTEXT,
        MPFROMSHORT(usID),
        (MPARAM) szText);
  }
}

/*****************************************************************
 *
 *  INTERNAL ROUTINE:
 *     GetMenuStrings
 *
 *  IMPLEMENTATION NOTES:
 *     This function calls itself recursively.
 *

*****************************************************************/
```

```
    void GetMenuStrings(
        HWND    hMenu,
        HMODULE hMriModule)
    {
      MPARAM mpResult;
      MENUITEM stMenuItem;
      char szText[81];
      int nCount;
      int nChars;
      unsigned short usID;
      int i;

// Query number of items in this menu
      mpResult = WinSendMsg(
          hMenu,
          MM_QUERYITEMCOUNT,
          (MPARAM) NULL,
          (MPARAM) NULL);
      nCount = SHORT1FROMMP(mpResult);

// For all items in menu
      for (i = 0; i < nCount; i++)
      {
        // Get the menu item ID
        mpResult = WinSendMsg(
            hMenu,
            MM_ITEMIDFROMPOSITION,
            MPFROMSHORT(i),
            (MPARAM) NULL);
        usID = SHORT1FROMMP(mpResult);

// Query menu item information
        mpResult = WinSendMsg(
            hMenu,
            MM_QUERYITEM,
            MPFROM2SHORT(usID, 0),
            (MPARAM) &stMenuItem);

// If submenu
        if (stMenuItem.afStyle & MIS_SUBMENU)
        {
          // call recursively for submenu
          GetMenuStrings(stMenuItem.hwndSubMenu, hMriModule);
        }

// Query the text of the menu item
        GetMenuItemString(hMenu, usID, hMriModule);
      }
    }

/******************************************************************
 *
 * API:
 *    cwbNL_LoadMenuStrings
 *
 * PURPOSE:
```

```
 *
 * IMPLEMENTATION NOTES:
 *

**************************************************************/
#pragma handler(cwbNL_LoadMenuStrings)
unsigned int CWB_ENTRY _Export cwbNL_LoadMenuStrings(
     HWND    hWndOwner,
     HWND    hMenu,
     HMODULE hMriModule)
{
  GetMenuStrings(hMenu, hMriModule);
  WinSendMsg(hWndOwner, WM_UPDATEFRAME, (MPARAM) NULL, (MPARAM) NULL);
  return CWB_OK;
}

/***************************************************************
 * API:
 *    cwbNL_LoadMenu
 *
 * PURPOSE:
 *    This module will control loading the named menu from the
 *    passed instance and the replacing of the text therein from
 *    the MRI file (passed as hMRIHandle).
 *
 * IMPLEMENTATION NOTES:
 *

**************************************************************/
#pragma handler(cwbNL_LoadMenu)
HWND CWB_ENTRY _Export cwbNL_LoadMenu(
     HWND    hWndOwner,
     HMODULE hModule,
     USHORT  usMenuID,
     HMODULE hMriModule)
{
  HWND hMenu;

hMenu = WinLoadMenu(hWndOwner, hModule, usMenuID);
  cwbNL_LoadMenuStrings(hWndOwner, hMenu, hMriModule);
  return(hMenu);
}
```

APPENDIX B

```
/****************************************************************/
/* Copyright * 5763-XA1 (C) copyright IBM Corp 1994, 1995.      */
/*    All rights reserved.                                      */
/****************************************************************/

/****************************************************************/
/*                                                              */
/* Module:                                                      */
/*   cwbnldlg.h                                                 */
/*                                                              */
/* Purpose:                                                     */
/*   OS/2 MRI Dialog Box Processing                             */
/*                                                              */
/*   This module contains the routines necessary to             */
/*   replace the translatable text (caption and control         */
/*   names) within a Presentation Manager dialog box.           */
/*                                                              */
/*   This module will also expand/contract controls according   */
/*   to the text associated with them.  The size of the dialog  */
/*   box frame will also be adjusted.                           */
/*                                                              */
/*   cwbNL_CalcControlGrowth                                    */
/*   cwbNL_CalDialogGrowth                                      */
/*   cwbNL_GrowControl                                          */
/*   cwbNL_GrowDialog                                           */
/*   cwbNL_LoadDialogStrings                                    */
/*   cwbNL_LoadMenu                                             */
/*   cwbNL_LoadMenuStrings                                      */
/*   cwbNL_SizeDialog                                           */
/*                                                              */
/*                                                              */
/****************************************************************/ if !defined(_CWBNLDLG_H_)
define      _CWNLDLG_H_ include "CWB.H"

define CWNLDLG_START CWB_LAST+1 define CWBNL_DLG_MENU_LOAD_ERROR      CWBNLDLG_START+1
define CWBNL_DLG_INVALID_HANDLE       CWBNLDLG_START+2

/****************************************************************/
/*                                                              */
/* API:                                                         */
/*    cwbNL_CalcControlGrowth                                   */
/*                                                              */
/*                                                              */
/* Purpose:                                                     */
/*   Routine to calculate the growth factor of an individual    */
/*   control within a dialog box.                               */
/*                                                              */
/* Parameters:                                                  */
/*   HWND window Handle - Input                                 */
/*     Window handle of the control to calculate the growth     */
```

```
/*       factor for.                                              */
/*                                                                */
/*   HPS hps - Input                                              */
/*                                                                */
/*   Presentation space.  Used for GpiTextBox call to             */
/*   determine extent needed for the translated string in         */
/*   the control.                                                 */
/*                                                                */
/*  Return Codes:                                                 */
/*   float - +/- growth needed to contain the string for          */
/*   the control.                                                 */
/*                                                                */
/*  Usage Notes:                                                  */
/*   It is assumed that the translated text has been              */
/*   loaded into the control prior to calling this function.      */
/*                                                                */
/*   A control that does not contain text will return a           */
/*   1.00 growth factor.  This means that it does not need to     */
/*   change size.                                                 */
/*                                                                */
/****************************************************************/
float CWB_ENTRY cwbNL_CalcControlGrowth(
                    HWND windowHandle,
                    HPS  hPS);

/****************************************************************/
/*                                                                */
/*  API:                                                          */
/*   cwbNL_CalcDialogGrowth                                       */
/*                                                                */
/*  Purpose:                                                      */
/*   Routine to calculate the growth factor of a dialog box.      */
/*   All of the controls within the dialog box will looked        */
/*   at to determine how much the dialog box size needs           */
/*   to be adjusted.                                              */
/*                                                                */
/*  Parameters:                                                   */
/*   HWND windowHandle - Input                                    */
/*     Window handle of the dialog box to calculate the           */
/*     growth factor for.                                         */
/*                                                                */
/*  Return codes:                                                 */
/*   float - +/- growth needed to contain the strings for         */
/*   all of the controls in the dialog box.                       */
/*                                                                */
/*  Usage Notes:                                                  */
/*   It is assumed that the translated text has been loaded       */
/*   into the controls prior to calling this function.            */
/*                                                                */
/*   A control that does not contain text will return a           */
/*   1.00 growth factor.  This means that it does not need        */
/*   to change size and will not be allowed to shrink.            */
/*                                                                */
/****************************************************************/
float CWB_ENTRY cwbNL_CalDialogGrowth(
                    HWND windowHandle);
```

```
/*****************************************************************/
/*                                                               */
/*  API:                                                         */
/*    cwbNL_GrowControl                                          */
/*                                                               */
/*  Purpose:                                                     */
/*    Routine to grow an individual control within a dialog      */
/*    box.                                                       */
/*                                                               */
/*  Parameters:                                                  */
/*    HWND windowHandle - Input                                  */
/*      Window handle of the control to be resized.              */
/*                                                               */
/*    float growthFactor - Input                                 */
/*      Multiplication factor for growing or shrinking the       */
/*      control.                                                 */
/*          1.00 = Stay same size                                */
/*          1.50 = 1 1/2 times original size                     */
/*                                                               */
/*    cwb_Boolean growAllControls - Input                        */
/*      CWB_TRUE = All controls will be resized by the           */
/*      growthFactor                                             */
/*      CWB_FALSE = Only controls with text will be resized.     */
/*                                                               */
/*  Return Codes:                                                */
/*    Return value from OS/2 function calls.                     */
/*                                                               */
/*  Usage Notes:                                                 */
/*    Care should be used to not pass in a growth factor         */
/*    that will cause a control to not fit on the physical       */
/*    display.                                                   */
/*                                                               */
/*****************************************************************/
unsigned int CWB_ENTRY cwbNL_GrowControl(
                        HWND            windowHandle,
                        float           growthFactor
                        cwb_Boolean     growAllControls);

/*****************************************************************/
/*                                                               */
/*  API:                                                         */
/*    cwbNL_GrowDialog                                           */
/*                                                               */
/*  Purpose:                                                     */
/*    Internal routine to growth the dialog box and its          */
/*    controls proportionally based off of a growth factor       */
/*    that is input.                                             */
/*                                                               */
/*  Parameters:                                                  */
/*    HWND windowHandle - Input                                  */
/*      Window handle of the window owning the controls          */
/*                                                               */
/*    float growthFactor - Input                                 */
/*      Multiplication factor for growing or shrinking the       */
```

```
/*      dialog box.  ie.                                        */
/*         1.00 = Stay same size                                */
/*         1.50 = 1 1/2 times original size                     */
/*                                                              */
/*    cwb_Boolean growAllControls - Input                       */
/*       CWB_TRUE = All controls will be resized by the         */
/*       growthFactor                                           */
/*       CWB_FALSE = Only controls with be resized.             */
/*                                                              */
/* Return Codes:                                                */
/*   Return value from OS/2 function calls.                     */
/*                                                              */
/* Usage Notes:                                                 */
/*   It is assumed that the translated text has been loaded     */
/*   into the controls prior to calling this function.          */
/*                                                              */
/*   The dialog box frame will not be allowed to grow larger    */
/*   than the desktop window size.                              */
/*                                                              */
/****************************************************************/
Unsigned int CWB_ENTRY cwbNL_GrowDialog(
                           HWND         windowHandle
                           float        growthFactor,
                           cwb_Boolean  growAllControls);

/****************************************************************/
/*                                                              */
/* API:                                                         */
/*   cwbNL_LoadDialogStrings                                    */
/*                                                              */
/* Purpose:                                                     */
/*   This routine will control the replacement of               */
/*   translatable text within a dialog box.  This includes      */
/*   dialog control text as well as the dialog box caption.     */
/*                                                              */
/* Parameters:                                                  */
/*   HMODULE MRIHandle - Input                                  */
/*     Handle of the module containing the strings for the      */
/*     dialog.                                                  */
/*                                                              */
/*   HWND windowHandle - Input                                  */
/*     Window handle of the dialog box.                         */
/*                                                              */
/*   USHORT menuID - Input                                      */
/*     ID of the menu for the dialog box.                       */
/*                                                              */
/*   HMODULE menuyLibHandle - Input                             */
/*     Handle of the module containing the menu for the         */
/*     dialog.                                                  */
/*                                                              */
/*   cwb_Boolean growAllControls - Input                        */
/*       CWB_TRUE = all controls will be resized by the         */
/*       growthfactor                                           */
/*       CWB_FALSE = Only with text will be resized.            */
/*                                                              */
/*                                                              */
```

```
/*  Return codes:                                                  */
/*    The following list shows common return values.               */
/*                                                                 */
/*    CWB_OK - Successful Completion                               */
/*    CWBNL_DLG_MENU_LOAD_ERROR - Could not load the menu          */
/*    CWBNL_DLG_INVALID_HANDLE - Incorrect MRIHandle               */
/*                                                                 */
/*  Usage Notes:                                                   */
/*    This process begins by enumerating, replacing the            */
/*    text of, and horizontally adjusting all dialog controls      */
/*    within the dialog to the adjusted controls therein.          */
/*    These adjustments are made only if the current window        */
/*    extents do not fully encompass the expansion space           */
/*    required for the text or all controls.                       */
/*                                                                 */
/*    After all of the text substitution has been completed,       */
/*    if a menu name has been passed (<> NULL), it will be         */
/*    loaded and attached to the dialog box.                       */
/*                                                                 */
/*    It is suggested that this routine be called for every        */
/*    dialog box procedure as the first thing done during the      */
/*    INITDLG message processing.                                  */
/*                                                                 */
/*******************************************************************/
unsigned int CWB_ENTRY cwbNL_LoadDialogStrings(
                        HMODULE       MRIHandle,
                        HWND          windowHandle,
                        USHORT        menuID,
                        HMODULE       menuLibHandle,
                        cwb_Boolean   growAllControls);
/*******************************************************************/
/*                                                                 */
/*  API:                                                            */
/*    cwbNL_LoadMenu                                                */
/*                                                                 */
/*  Purpose:                                                        */
/*    This routine will control the loading of the given menu      */
/*    from a module and replacing the translatable text            */
/*    within the menu.                                              */
/*                                                                 */
/*  Parameters:                                                     */
/*    HWND       windowHandle - Input                               */
/*      Window handle of the dialog box that contains the          */
/*      menu.                                                       */
/*                                                                 */
/*    HMODULE menuModuleHandle - Input                              */
/*      Handle of the module containing the menu for the           */
/*      dialog.                                                     */
/*                                                                 */
/*    USHORT    menuID - Input                                      */
/*      ID of the menu for the dialog box.                          */
/*                                                                 */
/*    HMODULE MRIHandle - Input                                     */
/*      Handle of the module containing the strings for the        */
/*      menu.                                                       */
```

```
/*                                                              */
/* Return Codes:                                                */
/*   HWND - Handle of the menu.                                 */
/*                                                              */
/* Usage Notes:                                                 */
/*                                                              */
/****************************************************************/

HWND CWB_ENTRY cwbNL_LoadMenu(
                    HWND        windowHandle,
                    HMODULE     menuModuleHandle,
                    USHORT      menuID,
                    HMODULE     MRIHandle);

/****************************************************************/
/*                                                              */
/* API:                                                         */
/*   cwbNL_LoadMenuStrings                                      */
/*                                                              */
/* Purpose:                                                     */
/*   This routine will control the replacement of               */
/*   translatable text within  menu.                            */
/*                                                              */
/* Parameters:                                                  */
/*   HMODULE MRIHandle - Input                                  */
/*     Handle of the module containing the strings for the      */
/*     menu.                                                    */
/*                                                              */
/*   HWND    windowHandle - Input                               */
/*     Window handle of the dialog box that contains the        */
/*     menu.                                                    */
/*                                                              */
/*   USHORT  menuID - Input                                     */
/*     ID of the menu for the dialog box.                       */
/*                                                              */
/*   HMODULE menuModuleHandle - Input                           */
/*     Handle of the module containing the menu for the         */
/*     dialog.                                                  */
/*                                                              */
/* Return Codes:                                                */
/*   The following list shows common return values.             */
/*                                                              */
/* CWB_OK - Successful Completion                               */
/*                                                              */
/* Usage Notes:                                                 */
/*                                                              */
/****************************************************************/
unsigned int CWB_ENTRY cwbNL_LoadMenuStrings(
                    HWND        ownerWindowHandle,
                    HWND        menuHandle,
                    HMODULE     MRIHandle);

/****************************************************************/
/*                                                              */
/* API:                                                         */
```

```
/*   cwbNL_SizeDialog                                      */
/*                                                         */
/*   Purpose:                                              */
/*     This Routine will control the sizing of the dialog box */
/*     and its child controls. The expansion amount is based */
/*     off of the length of the text extent and the length of */
/*     each control.  The growth of the dialog box and its */
/*     controls will be proportional.  By setting the      */
/*     growAllControls to FALSE, only controls with text will */
/*     expand/contract,.  This allows the programmer the   */
/*     flexibility of non-translatable fields to remain the */
/*     same size.  This may make sense for dialogs that contain*/
/*     drop-down lists, combo-boxes, or spin buttons.      */
/*                                                         */
/*   Parameters:                                           */
/*     HWND windowHandle - Input                           */
/*       Window handle of the window owning the controls.  */
/*                                                         */
/*     cwb_Boolean growAllControls - Input                 */
/*       CWB_TRUE = all controls will be resized by the    */
/*       growthfactor                                      */
/*       CWB_FALSE = Only with text will be resized.       */
/*                                                         */
/*   Return codes:                                         */
/*     The following list shows common return values.      */
/*                                                         */
/*     CWB_OK - Successful Completion                      */
/*                                                         */
/*   Usage Notes:                                          */
/*     This routine assumes that the translated text has   */
/*     already been loaded into the dialog box controls.  If */
/*     the text has not been loaded into the controls, you */
/*     should use cwbNL_LoadDialog.                        */
/*                                                         */
/***********************************************************/
unsigned int CWB_ENTRY cwbNL_SizeDialog(
                         HWND        windowHandle,
                         cwb_Boolean growallControls);

#endif /* _CWBNLDLG_H_ */
```

What is claimed is:

1. A method for resizing a plurality of controls located in a window displayed in a graphical user interface in a data processing system, wherein the plurality of controls include replacement symbols, the method comprising:

determining an amount of resizing for each of the plurality of controls required to contain the replacement symbols;

recording a maximum amount of resizing in response to the determining step;

resizing the window and resizing and repositioning the plurality of controls using the maximum amount of resizing recorded in the recording step;

determining whether the maximum amount of resizing will expand the window beyond the portion of the graphical user interface displayed to the user on a display device prior to resizing the window and the plurality of controls; and adjusting the maximum amount of resizing such that the window is fully displayed within the display device in response to a determination that the maximum amount of resizing would expand the window beyond the portion of the graphical user interface displayed to the user.

2. The method of claim 1, wherein the step of determining further comprises determining an amount of resizing for the window containing the plurality of controls.

3. The method of claim 1, wherein the step of resizing comprises resizing horizontal and vertical components of the window and the plurality of controls.

4. A data processing system for resizing and repositioning a plurality of controls in a window displayed in a graphical user interface in the data processing system, wherein the plurality of controls contain symbols, the data processing system comprising:

replacement means for replacing symbols in the plurality of controls with replacement symbols;

determination means for determining an amount of resizing for each of the plurality of controls required to contain the replacement symbols;

recording means for recording a maximum amount of resizing in response to the determining means;

resizing means for resizing the window and resizing and repositioning the plurality of controls utilizing the maximum amount of resizing recorded in the recording means;

determination means for determining whether the maximum amount of resizing will expand the window beyond the portion of the graphical user interface displayed to the user on a display device prior to resizing the window and the plurality of controls; and adjustment means for adjusting the maximum amount of resizing such that the window is fully displayed within the display device in response to a determination that the maximum amount of resizing would expand the window such that a full display of the window within the display device would be absent.

5. The data processing system of claim 4, wherein the determination means determination further comprises means for determining an amount of resizing for the window containing the plurality of controls.

6. The data processing system of claim 4, wherein the resizing means of resizing comprises means for resizing a horizontal component of the window and plurality of controls.

7. The data processing system of claim 4, wherein the symbols replaced by the replacement means are text.

8. The data processing system of claim 4, wherein the replacement symbols are stored in storage device within the data processing system.

9. The data processing system of claim 4, wherein the resizing means only resizes controls containing symbols.

10. The data processing system of claim 4, wherein replacement symbols are stored in a file and each of the plurality of controls is associated with an identifier, wherein the replacement means replaces symbols using the identifier to locate the symbols within the file.

11. A data processing system for resizing a plurality of controls in a window displayed in a graphical user interface in the data processing system, wherein the plurality of controls contain symbols, the data processing system comprising:

memory means for storing the window and the plurality of controls; and processing means coupled to the memory means, the processing means includes means for replacing symbols in the plurality of controls with replacement symbols, means for determining an amount of resizing for each of the plurality of controls required to contain the replacement symbols, means for recording a maximum amount of resizing in response to the means for determining, means for resizing the window and controls utilizing the maximum amount of resizing recorded in the means for recording, means for determining whether the maximum amount of resizing will expand the window beyond the portion of the graphical user interface displayed to the user on a display device prior to resizing the window and the plurality of controls, and means for adjusting the maximum amount of resizing such that the window is fully displayed within the display device in response to a determination that the maximum amount of resizing would expand the window such that a full display of the window within the display device would be absent.

12. The data processing system of claim 11, wherein the symbols replaced by the means for replacing symbols are text.

13. A storage device readable by data processing system and encoding data processing system executable instructions for resizing a plurality of controls in a window displayed in a graphical user interface, the data storage device comprising:

means for replacing symbols in the plurality of controls with replacement symbols;

means for determining an amount of resizing for each of the plurality of controls required to contain the replacement symbols;

means for recording a maximum amount of resizing in response to the means for determining;

means for resizing the window and controls utilizing the maximum amount of resizing recorded by the means for recording, wherein the means are activated when the storage device is connected to and accessed by the data processing system;

means for determining whether the maximum amount of resizing will expand the window beyond the portion of the graphical user interface displayed to the user on a display device prior to resizing the window and the plurality of controls; and means for adjusting the maximum amount of resizing such that the window is fully displayed within the display device in response to a determination that the maximum amount of resizing would expand the window such that a full display of the window within the display device would be absent.

14. The storage device of claim 13, wherein the storage device is hard disk drive.

15. The storage device of claim 13, wherein the storage device is a ROM for use with a data processing system.

16. The storage device of claim 13, wherein the storage device is a floppy diskette.

* * * * *